United States Patent
Hirasawa et al.

(10) Patent No.: US 10,181,197 B2
(45) Date of Patent: Jan. 15, 2019

(54) TRACKING ASSISTANCE DEVICE, TRACKING ASSISTANCE SYSTEM, AND TRACKING ASSISTANCE METHOD

(71) Applicant: PANASONIC INTELLECTUAL PROPERTY MANAGEMENT CO., LTD., Osaka (JP)

(72) Inventors: Sonoko Hirasawa, Kanagawa (JP); Takeshi Fujimatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 15/548,210

(22) PCT Filed: Feb. 8, 2016

(86) PCT No.: PCT/JP2016/000628
§ 371 (c)(1),
(2) Date: Aug. 2, 2017

(87) PCT Pub. No.: WO2016/132705
PCT Pub. Date: Aug. 25, 2016

(65) Prior Publication Data
US 2018/0033153 A1 Feb. 1, 2018

(30) Foreign Application Priority Data
Feb. 20, 2015 (JP) .................................. 2015-032036

(51) Int. Cl.
*G06T 7/292* (2017.01)
*H04N 7/18* (2006.01)
(Continued)

(52) U.S. Cl.
CPC ............. *G06T 7/292* (2017.01); *G06F 3/0485* (2013.01); *G06F 3/04842* (2013.01); *G06K 9/00* (2013.01);
(Continued)

(58) Field of Classification Search
USPC ......................................................... 382/103
See application file for complete search history.

(56) References Cited

U.S. PATENT DOCUMENTS 7,242,423 B2 * 7/2007 Lin .................. G08B 13/19645
348/169
7,394,916 B2 * 7/2008 Brodsky .................. G06K 9/32
348/142
(Continued)

FOREIGN PATENT DOCUMENTS

JP         4759988 B2    8/2011
JP     2014/153813 A    8/2014
(Continued)

OTHER PUBLICATIONS

U.S. Appl. No. 15/535,948 to Junko Ueda et al., filed Jun. 14, 2017.
(Continued)

*Primary Examiner* — Ishrat I Sherali
(74) *Attorney, Agent, or Firm* — Greenblum & Bernstein, P.L.C.

(57) ABSTRACT

Included are tracking target setter that sets a person as a tracking target in response to designation by a monitoring person, confirmation video presenter that extracts a video of a moving object with the highest possibility of being the moving object which is the target, based on tracking information, and displays only the videos as confirmation videos, candidate video presenter that displays as a candidate video, a video of a moving object that may be the moving object set as the tracking target is the next highest of the moving object
(Continued)

of the confirmation video having an error, where there is an error in the confirmation video, and causes selection of a corresponding candidate video by the monitoring person, and tracking information corrector that corrects the tracking information so that the moving object corresponding to the selected candidate video is associated with the moving object set as the tracking target.

13 Claims, 23 Drawing Sheets

(51) Int. Cl.
G06F 3/0484 (2013.01)
G06F 3/0485 (2013.01)
G06K 9/00 (2006.01)
G08B 13/196 (2006.01)

(52) U.S. Cl.
CPC . *G08B 13/19608* (2013.01); *G08B 13/19682* (2013.01); *G08B 13/19693* (2013.01); *H04N 7/18* (2013.01); *H04N 7/181* (2013.01); *G06T 2207/10016* (2013.01); *G06T 2207/30196* (2013.01); *G06T 2207/30232* (2013.01)

(56) References Cited

U.S. PATENT DOCUMENTS

| | | | | |
|---|---|---|---|---|
| 7,450,735 | B1 * | 11/2008 | Shah | G06T 7/292 348/143 |
| 7,787,013 | B2 * | 8/2010 | Yoshida | H04N 7/181 348/153 |
| 8,781,293 | B2 * | 7/2014 | Ni | H04N 9/8227 348/152 |
| 8,891,821 | B2 | 11/2014 | Sato | |
| 9,191,633 | B2 | 11/2015 | Fujimatsu et al. | |
| 9,251,599 | B2 * | 2/2016 | Hirasawa | G06T 7/292 |
| 9,357,181 | B2 | 5/2016 | Fujimatsu et al. | |
| 9,779,308 | B2 | 10/2017 | Kuwahara et al. | |
| 2004/0257444 | A1 * | 12/2004 | Maruya | G08B 13/19645 348/169 |
| 2008/0130951 | A1 * | 6/2008 | Wren | H04N 7/18 382/103 |
| 2008/0292140 | A1 * | 11/2008 | Morris | G06K 9/00295 382/103 |
| 2014/0050455 | A1 * | 2/2014 | Ni | H04N 9/8227 386/224 |
| 2015/0015704 | A1 | 1/2015 | Hirasawa et al. | |
| 2015/0248751 | A1 | 9/2015 | Ebiyama | |
| 2015/0356840 | A1 | 12/2015 | Wang et al. | |
| 2016/0063731 | A1 | 3/2016 | Yamamoto et al. | |
| 2016/0260226 | A1 * | 9/2016 | Yano | G06T 7/277 |
| 2017/0124388 | A1 | 5/2017 | Ueda | |
| 2017/0134644 | A1 | 5/2017 | Ueda | |

FOREIGN PATENT DOCUMENTS

| | | |
|---|---|---|
| JP | 2015-019250 A | 1/2015 |
| WO | 2014/045670 A1 | 8/2016 |

OTHER PUBLICATIONS

Search Report issued in International Patent Application No. PCT/JP2016/000628, dated May 10, 2016.

* cited by examiner

TRACKING ASSISTANCE DEVICE, TRACKING ASSISTANCE SYSTEM, AND TRACKING ASSISTANCE METHOD

TECHNICAL FIELD

The present disclosure relates to a tracking assistance device, a tracking assistance system, and a tracking assistance method, which each displays on a display device, videos which are respectively captured by a plurality of cameras and are accumulated in video accumulation means and assists a work by a monitoring person of tracking a moving object which is a tracking target.

BACKGROUND ART

A monitoring system in which a plurality of cameras are installed in a monitoring area and a monitoring screen for displaying a video from each of the plurality of cameras is displayed on a monitor so as to be monitored by a monitoring person has been widely spread. In such a monitoring system, a monitoring person can check what types of actions a person, who performed a problematic action such as shoplifting, performs in the monitoring area, by accumulating the videos from the cameras in a recorder.

In this way, in a case where a monitoring person tracks a person while viewing the monitoring screen, as the person moves in the monitoring area, the cameras which capture the image of the person are switched one by one, so that it is required to sequentially check the video from each of the cameras.

Thus, a technique of providing a video display window for displaying a video from each camera on the display screen of the monitor, displaying the video of the person designated by the monitoring person as the tracking target in the video display window, and the traveling route of the person on the display screen of the monitor has been known (see PTL 1). In this technique, since the traveling route is displayed, it is possible to relatively easily perform a tracking work while changing cameras one by one, thereby reducing to a certain extent of the burden on the monitoring person who performs the tracking work.

CITATION LIST

Patent Literature

PTL 1: Japanese Patent No. 4759988

SUMMARY OF THE INVENTION

A tracking assistance device of the present disclosure is a tracking assistance device that displays on a display device, videos which are respectively captured by a plurality of cameras and are accumulated in video accumulation means, and assists a work by a monitoring person of tracking a moving object which is a tracking target, and includes a tracking target setter that displays the videos accumulated in the video accumulation means on the display device, and in response to an operation input by a monitoring person of designating a moving object to be a tracking target on the videos, sets the designated moving object as the tracking target; a confirmation video presenter that extracts for each of the cameras, a video of a moving object having a highest possibility of being the moving object set as the tracking target, based on tracking information acquired in a tracking process executed on the videos accumulated in the video accumulation means, and displays a tracking target confirmation screen in which only the extracted videos are displayed as confirmation videos, on the display device; a candidate video presenter that extracts a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displays on the display device, a candidate selection screen in which the extracted videos are displayed as candidate videos so as to cause the candidate video corresponding to the moving object designated as the tracking target to be selected by the monitoring person; and a tracking information corrector that corrects the tracking information so as to associate the moving object corresponding to the candidate video selected on the candidate selection screen with the moving object set as the tracking target.

A tracking assistance system of the present disclosure is a tracking assistance system that displays on a display device, videos which are respectively captured by a plurality of cameras and are accumulated in video accumulation means and assists a work by a monitoring person of tracking a moving object which is a tracking target, and includes the camera that captures an image of a monitoring area; the display device that displays a video from each of the cameras; and a plurality of information processing devices, in which any one of the plurality of information processing devices includes tracking target setting means for displaying the videos accumulated in the video accumulation means on the display device, and in response to an operation input by a monitoring person of designating a moving object to be a tracking target on the videos, setting the designated moving object as the tracking target; a confirmation video presenter that extracts for each of the cameras, a video of a moving object having a highest possibility of being the moving object set as the tracking target, based on tracking information acquired in a tracking process executed on the videos accumulated in the video accumulation means, and displays a tracking target confirmation screen in which only the extracted videos are displayed as confirmation videos, on the display device; a candidate video presenter that extracts a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displays on the display device, a candidate selection screen in which the extracted videos are displayed as candidate videos so as to cause the candidate video corresponding to the moving object designated as the tracking target to be selected by the monitoring person; and a tracking information corrector that corrects the tracking information so as to associate the moving object corresponding to the candidate video selected on the candidate selection screen with the moving object set as the tracking target.

A tracking assistance method of the present disclosure is a tracking assistance method causing an information processing device to perform a process of displaying on a display device, videos which are respectively captured by a plurality of cameras and are accumulated in video accumulation means and assisting a work by a monitoring person of tracking a moving object which is a tracking target, including a step of displaying the videos accumulated in the video accumulation means on the display device, and in response to an operation input by a monitoring person of designating a moving object to be a tracking target on the videos, setting the designated moving object as the tracking target; a step of extracting for each of the cameras, a video of a moving object having a highest possibility of being the moving object set as the tracking target, based on tracking information acquired in a tracking process executed on the videos accumulated in the video accumulation means, and displaying a tracking target confirmation screen in which only the extracted videos are displayed as confirmation videos, on the display device; and a step of extracting a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displaying on the display device, a candidate selection screen in which the extracted videos are displayed as candidate videos so as to cause the candidate video corresponding to the moving object designated as the tracking target to be selected by the monitoring person.

According to the present disclosure, since the video from a camera having the highest possibility of showing the moving object set as the tracking target is refined and displayed, it is possible to efficiently check the tracking result for a moving object. In a case where there is an error in the confirmation video displayed in the tracking target confirmation screen, that is, there is an error in the tracking result for the moving object, a video whose possibility of showing a moving object set as the tracking target is the next highest of the confirmation video is displayed as a candidate video on a candidate selection screen, so tracking information is corrected simply by the monitoring person selecting the candidate video, and thus tracking information can be corrected with a simple operation.

DESCRIPTION OF EMBODIMENTS

Figure 1:
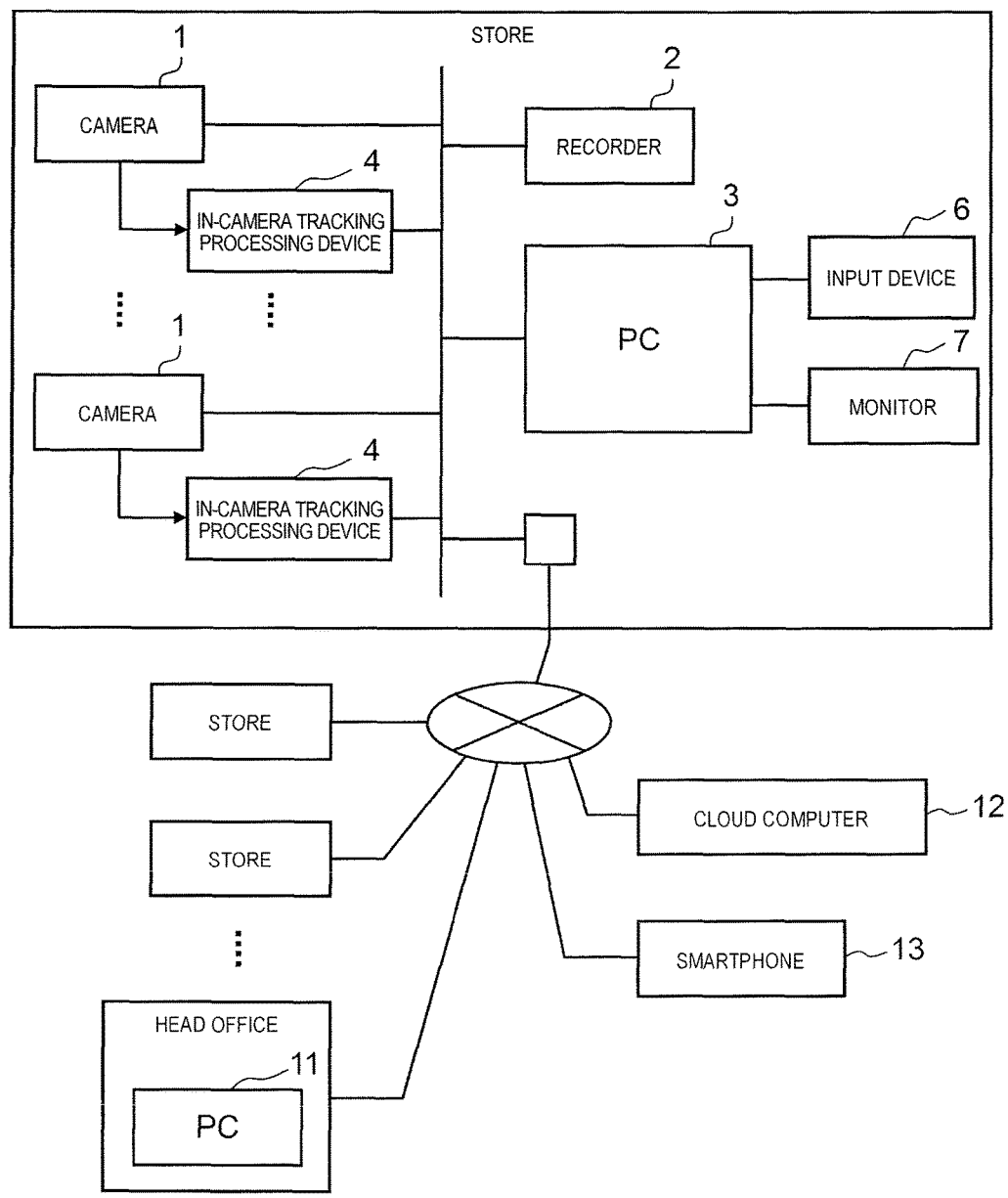
FIG. 1 is an overall configuration diagram of a tracking assistance system according to a first exemplary embodiment.

Prior to the description of the exemplary embodiments of the present disclosure, a brief description will be given on problems in the related art. A device is caused to perform a process of tracking the person using an image recognition technique in order to sequentially display the video from each camera related to a person designated as a tracking target, on the display screen of a monitor, but in the tracking process, there is a case where an error occurs in the tracking result, such as the tracking of a person designated as a tracking target fails, and the person is replaced with another person. If an error occurs in the tracking result in this way, it hinders the work of tracking a person, and thus it is necessary to check whether there is an error in the tracking result. Particularly, in a large-scale monitoring system covering a wide monitoring area, a large number of monitoring cameras such as dozens or hundreds of surveillance cameras are used, it is extremely troublesome to checking the tracking result. Therefore, a technique capable of efficiently checking the tracking result is desired.

However, according to the technique disclosed in PTL 1, since a person set as a tracking target is not always shown in any video display window of the screen, that is, the video of the person set as a tracking target is not displayed on the screen without omission throughout the entire moving path in the monitoring area, it is not possible to efficiently check the tracking result for a person set as the tracking target, and especially there is a problem that checking is complicated, as the number of cameras increases. In addition, in a case where there is an error in the tracking result for a person, there is a problem that it is impossible to effectively deal with the problem in the related art, and it is impossible to properly perform an assistance process for reducing the burden on the monitoring person.

The present disclosure has been devised to solve such problems in the related art, and a main object thereof is to provide a tracking assistance device, a tracking assistance system, and a tracking assistance method, which are configured to efficiently check whether there is an error in the tracking result for the moving object set as the tracking target and to be able to correct tracking information with a simple operation in a case where there is an error in the tracking result for the moving object.

A first disclosure made to solve the above problems is a tracking assistance device that displays on a display device, videos which are respectively captured by a plurality of cameras and are accumulated in video accumulation means, and assists a work by a monitoring person of tracking a moving object which is a tracking target, and includes a tracking target setter that displays the videos accumulated in the video accumulation means on the display device, and in response to an operation input by a monitoring person of designating a moving object to be a tracking target on the videos, sets the designated moving object as the tracking target; a confirmation video presenter that extracts for each of the cameras, a video of a moving object having a highest possibility of being the moving object set as the tracking target, based on tracking information acquired in a tracking process executed on the videos accumulated in the video accumulation means, and displays a tracking target confirmation screen in which only the extracted videos are displayed as confirmation videos, on the display device; a candidate video presenter that extracts a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displays on the display device, a candidate selection screen in which the extracted videos are displayed as candidate videos so as to cause the candidate video corresponding to the moving object designated as the tracking target to be selected by the monitoring person; and a tracking information corrector that corrects the tracking information so as to associate the moving object corresponding to the candidate video selected on the candidate selection screen with the moving object set as the tracking target.

According to this, since the video from camera having the highest possibility of showing the moving object set as the tracking target is refined and displayed, it is possible to efficiently check the tracking result for a moving object. In a case where there is an error in the confirmation video displayed in the tracking target confirmation screen, that is, there is an error in the tracking result for the moving object, a video whose possibility of showing a moving object set as the tracking target is the next highest of the confirmation video is displayed as a candidate video on a candidate selection screen, so tracking information is corrected simply by the monitoring person selecting the candidate video, and thus tracking information can be corrected with a simple operation.

In a second disclosure, a plurality of confirmation videos are arranged and displayed in order of imaging time on the tracking target confirmation screen.

According to this, confirmation videos are arranged and displayed in order of imaging time on the tracking target confirmation screen, so the monitoring person can check whether there is an error in the tracking result for the moving object set as the tracking target by only viewing the confirmation videos in order, and it is possible to more efficiently check the tracking result for a moving object.

In a third disclosure, the tracking target setter causes the monitoring person to select a plurality of cameras, arranges and displays videos from each of the selected plurality of cameras on a screen, and causes the monitoring person to designate a moving object to be a tracking target.

According to this, since the videos from the plurality of camera assumed to image the moving object to be a tracking target are displayed on the same screen, the monitoring person can efficiently designate the moving object to be a tracking target can be performed efficiently.

In a fourth disclosure, a scroll operation portion for sliding and displaying the confirmation videos in an arrangement direction of the confirmation videos in a case where a plurality of the confirmation videos cannot fit in the display area of the confirmation videos on the tracking target confirmation screen is provided on the tracking target confirmation screen.

According to this, it is possible to check all the candidate selection videos within one screen, and the monitoring person can efficiently check whether or not there is an error in the tracking result for the moving object set as the tracking target.

In a fifth disclosure, a scroll operation portion for sliding and displaying the candidate videos in an arrangement direction of the candidate videos in a case where a plurality of the candidate videos cannot fit in the display area of the candidate videos on the candidate selection screen is provided on the candidate selection screen.

According to this, it is possible to check all the candidate videos within one screen, and the monitoring person can efficiently select candidate videos.

In a sixth disclosure, the tracking target setter displays on the display device, a tracking target search screen on which a video satisfying a search condition is displayed, in response to an operation input of a monitoring person that input the search condition about a imaging date and time and the camera, and causes the monitoring person to search for a video showing the moving object to be the tracking target on the tracking target search screen, and to designate the moving object to be the tracking target.

According to this, since the videos displayed on the tracking target search screen are refined in accordance with the search condition related to the imaging date and time and the camera, the monitoring person can efficiently designate the moving object to be the tracking target.

In a seventh disclosure, the candidate selection screen is obtained by adding a candidate video viewer for displaying the candidate video to the tracking target confirmation screen.

According to this, since the candidate video is displayed on the same screen as the confirmation video, the monitoring person can select candidate videos while comparing the candidate video with the confirmation video, and the monitoring person can efficiently select the candidate video.

In an eighth disclosure, it is configured to further include a video player that displays on the display device, a continuous playback screen in which a moving object set as the tracking target, and a video from each of the cameras related to a moving object associated as the same as the moving object are arranged and displayed in order of imaging time, and performs continuous playback in which the video from each camera is sequentially displayed as a moving image with the lapse of time, on the continuous playback screen.

According to this, since the moving object which is the tracking target can be tracked continuously, the monitoring person can easily check what movement the moving object which is the tracking target performs in the monitoring area.

In a ninth disclosure, it is configured to further include a screen generator that displays on the display device, a camera position confirmation screen on which a position of a camera corresponding to a video being played on a map image indicating the state of a monitoring area, in response to an operation of the monitoring person performed on the continuous playback screen.

According to this, although it is difficult to know the position of the camera which captures a video being played back only on the continuous playback screen, it is possible to simply check the position of the camera which captures a video being played back by viewing the camera position confirmation screen.

In a tenth disclosure, it is configured to further include an additional tracking target setter that in a case where there is no candidate video corresponding to the moving object designated as the tracking target, among the candidate videos displayed on the candidate selection screen, displays a video of a period corresponding to the confirmation video with an error on the display device, and in response to an operation input by the monitoring person of designating the moving object to be the tracking target on the video, sets the designated moving object as an additional tracking target, and the tracking information corrector corrects tracking information such that the moving object which is set as the additional tracking target by the additional tracking target setter is associated with the moving object which is set as the tracking target by the tracking target setter.

According to this, even when there is no candidate video corresponding to the moving object designated as the tracking target among the candidate videos displayed on the candidate selection screen, the monitoring person designates the moving object which is the tracking target, and thus tracking information corresponding to a confirmation video with an error is corrected, so that it is possible to avoid the lack of tracking information.

In an eleventh disclosure, it is configured to further include a video display period setter that in a case where there is no candidate video corresponding to the moving object designated as the tracking target, among the candidate videos displayed on the candidate selection screen, if the monitoring person inputs an operation of designating a period during which the moving object designated as the tracking target appears on a video, sets the designated period as a video display period, in which the tracking information corrector adds the video display period which is set by the video display period setter, to the tracking information.

According to this, even when there is no candidate video corresponding to the moving object designated as the tracking target among the candidate videos displayed on the candidate selection screen, the monitoring person designates the video display period, and thus tracking information corresponding to a confirmation video with an error is replaced with the video display period, so that it is possible to avoid the lack of tracking information. In particular, it is possible to prevent the video from being interrupted, when performing continuous playback in which the video from each camera is sequentially displayed as a moving image with the lapse of time.

A twelfth disclosure is a tracking assistance system that displays on a display device, videos which are respectively captured by a plurality of cameras and are accumulated in video accumulation means and assists a work by a monitoring person of tracking a moving object which is a tracking target, and includes the camera that captures an image of a monitoring area; the display device that displays a video from each of the cameras; and a plurality of information processing devices, in which any one of the plurality of information processing devices includes tracking target setting means for displaying the videos accumulated in the video accumulation means on the display device, and in response to an operation input by a monitoring person of designating a moving object to be a tracking target on the videos, setting the designated moving object as the tracking target; a confirmation video presenter that extracts for each of the cameras, a video of a moving object having a highest possibility of being the moving object set as the tracking target, based on tracking information acquired in a tracking process executed on the videos accumulated in the video accumulation means, and displays a tracking target confirmation screen in which only the extracted videos are displayed as confirmation videos, on the display device; a candidate video presenter that extracts a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displays on the display device, a candidate selection screen in which the extracted videos are displayed as candidate videos so as to cause the candidate video corresponding to the moving object designated as the tracking target to be selected by the monitoring person; and a tracking information corrector that corrects the tracking information so as to associate a moving object corresponding to the candidate video selected on the candidate selection screen with the moving object set as the tracking target.

According to this, similar to the first disclosure, it is possible to efficiently check whether there is an error in the tracking result for the moving object set as the tracking target, and it is possible to correct the tracking information with a simple operation, in a case where there is an error in the tracking result.

A thirteenth disclosure is a tracking assistance method causing an information processing device to perform a process of displaying on a display device, videos which are respectively captured by a plurality of cameras and are accumulated in video accumulation means and assisting a work by a monitoring person of tracking a moving object which is a tracking target, including a step of displaying the videos accumulated in the video accumulation means on the display device, and in response to an operation input by a monitoring person of designating a moving object to be a tracking target on the videos, setting the designated moving object as the tracking target; a step of extracting for each of the cameras, a video of a moving object having a highest possibility of being the moving object set as the tracking target, based on tracking information acquired in a tracking process executed on the videos accumulated in the video accumulation means, and displaying a tracking target confirmation screen in which only the extracted videos are displayed as confirmation videos, on the display device; and a step of extracting a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displaying on the display device, a candidate selection screen in which the extracted videos are displayed as candidate videos so as to cause the candidate video corresponding to the moving object designated as the tracking target to be selected by the monitoring person.

According to this, similarly to the first disclosure, it is possible to efficiently check whether there is an error in the tracking result for the moving object which is the tracking target, and it is possible to correct the tracking information with a simple operation, in a case where there is an error in the tracking result.

Hereinafter, exemplary embodiments will be described with reference to the drawings. In the description of the present exemplary embodiment, two separate Japanese terms having the same meaning of tracking are used. Although they are merely used for convenience of explanation, and they are distinguished depending on usage related to a monitoring person's behavior and usage related to the processes performed on devices.

First Exemplary Embodiment

FIG. 1 is an overall configuration diagram of a tracking assistance system according to a first exemplary embodiment. The tracking assistance system is constructed for a retail store such as a supermarket and a home center, and includes camera 1, recorder (video accumulation means) 2, PC (tracking assistance device) 3, and in-camera tracking processing device 4.

Camera 1 is installed at an appropriate place in the store, and the inside of the store (monitoring area) is imaged by camera 1, and the videos of the interior of the store captured by camera 1 are recorded in recorder 2.

PC 3 is connected with input device 6 such as a mouse with which a monitoring person performs various input operations and monitor (display device) 7 that displays a monitoring screen. PC 3 is installed in a security room or the like of a store, and a monitoring person (security guard) can view the videos of the interior of the store captured by camera 1 in real time on a monitor screen displayed on monitor 7, and view the past videos of the interior of the store recorded in recorder 2.

A monitor not shown in FIG. 1 is also connected to PC 11 provided in the head office, displays the videos of the interior of the store captured by camera 1 in real time, and displays the past videos of the interior of the store recorded in recorder 2, which allows a user at the head office to check the status in the store.

In-camera tracking processing device 4 performs a process of tracking a person (moving object) detected from the video from camera 1 and generating in-camera tracking information for each person. For the in-camera tracking process, known image recognition techniques (such as a person detection technique and a person tracking technique) may be used.

In the present exemplary embodiment, in-camera tracking processing device 4 is configured to constantly perform an in-camera tracking process independently of PC 3, but may perform the tracking process in response to an instruction from PC 3. It is desirable that in-camera tracking processing device 4 performs the tracking process for all people detected from the video, but the tracking process may be performed by focusing on the person designated as the tracking target and a person highly relevant to the person.

Figure 2:
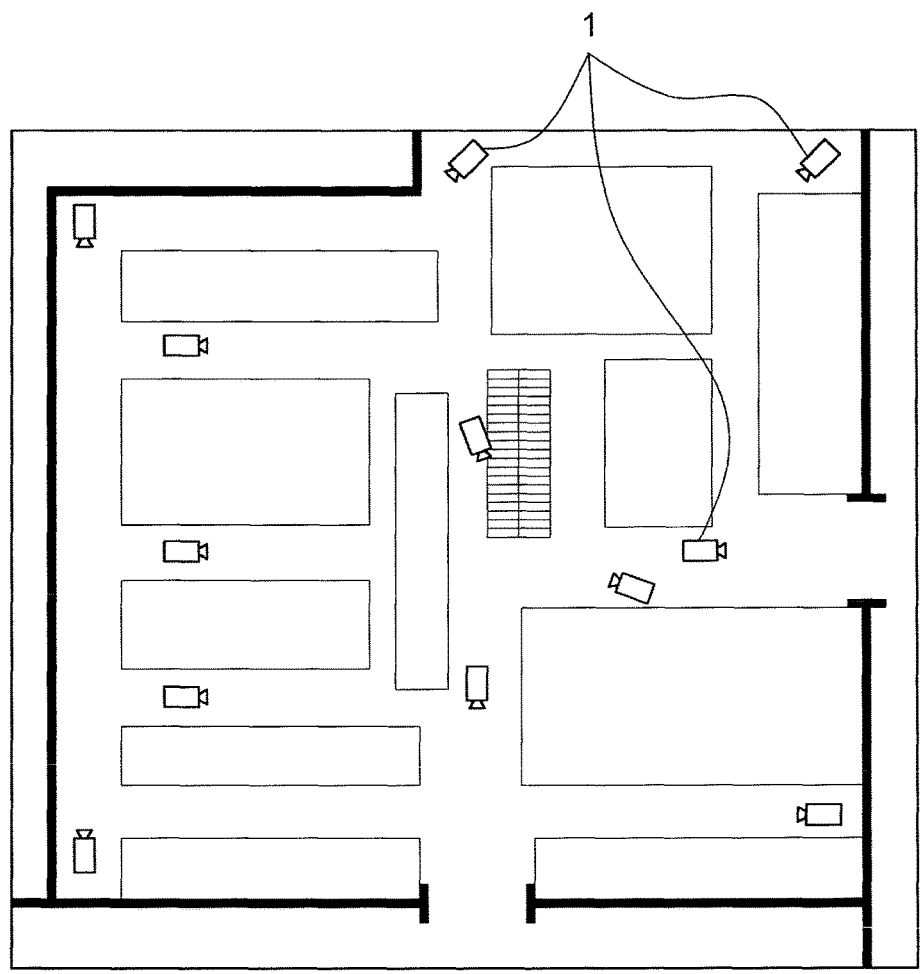
FIG. 2 is a plan view showing an installation status of camera 1 in a store.

Next, the installation status of camera 1 in the store shown in FIG. 1 will be described. FIG. 2 is a plan view showing the installation status of camera 1 in the store.

In the store (monitoring area), a passage is provided between commodity display spaces, and a plurality of cameras 1 are installed so as to mainly image the passage.

When a person moves in a passage in the store, the person is imaged by one or more of cameras 1, and in accordance with the movement of the person, imaging of the person is handed over to next camera 1. At this time, a camera that takes over the imaging of a person is limited by the form of the passage in the store and the imaging area of camera 1, and in the present exemplary embodiment, the camera that takes over the imaging of a person is referred to as a camera having a cooperation relationship. Information on the cooperation relationship of the camera is set in advance, and is held in PC 3 as camera cooperation information. The information on the cooperation relationship of the cameras is prepared for a change in the number of cameras 1 and the installation locations thereof, or the like, the installation information of each camera 1 may be individually acquired by PC 3 at the time of starting the system, and the information on the cooperation relationship of the respective cameras may be updated.

Figure 3:
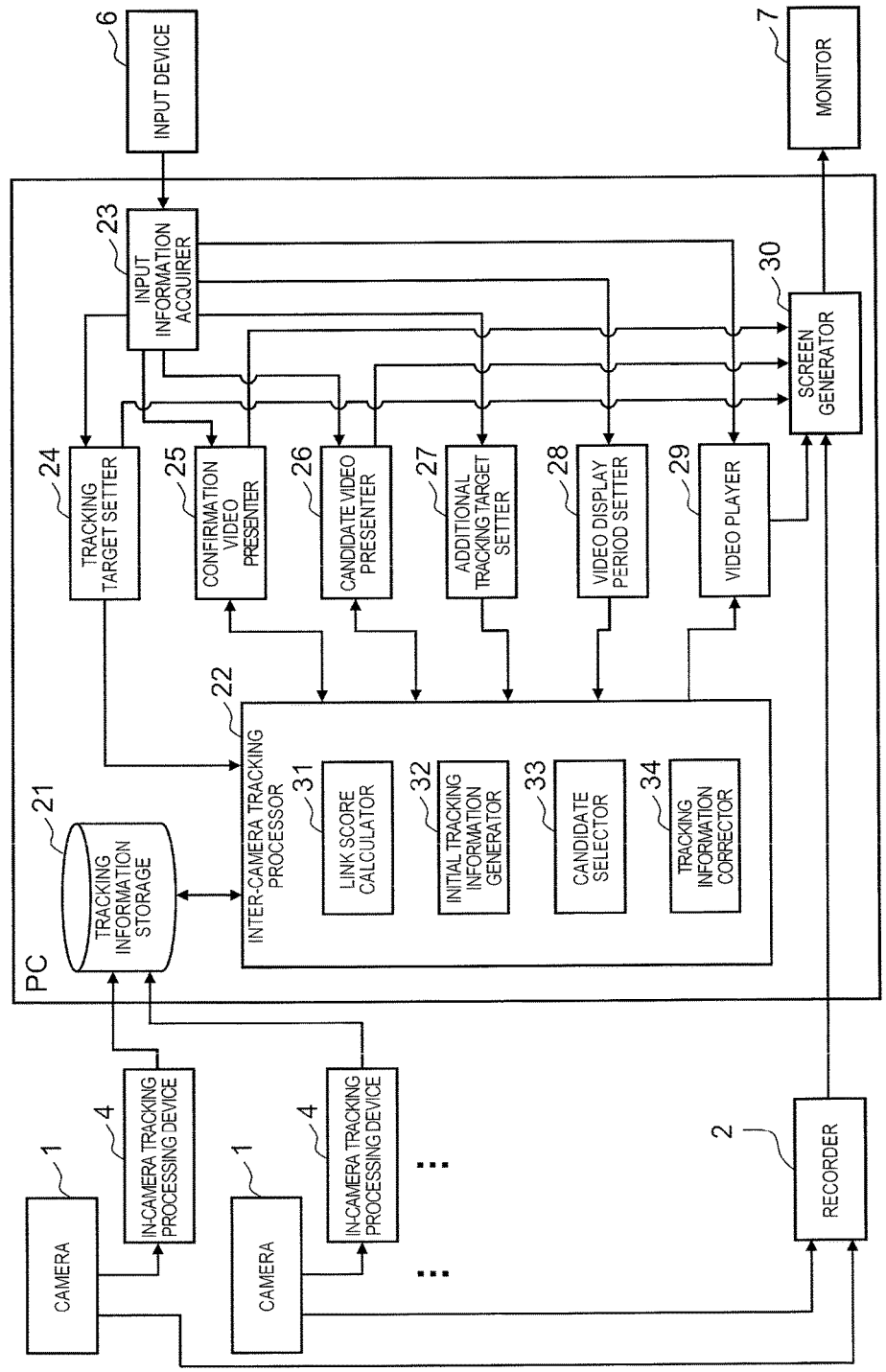
FIG. 3 is a functional block diagram illustrating a schematic configuration of PC 3.

Next, a schematic configuration of PC 3 shown in FIG. 1 will be described. FIG. 3 is a functional block diagram illustrating a schematic configuration of PC 3.

PC 3 includes tracking information storage 21, inter-camera tracking processor 22, input information acquirer 23, tracking target setter 24, confirmation video presenter 25, candidate video presenter 26, additional tracking target setter 27, video display period setter 28, video player 29, and screen generator 30.

The in-camera tracking information generated by in-camera tracking processing device 4 is accumulated in tracking information storage 21. The inter-camera tracking information generated by inter-camera tracking processor 22 is accumulated in tracking information storage 21.

Input information acquirer 23 performs a process of acquiring input information based on an input operation, in response to the input operation by a monitoring person using input device 6 such as a mouse.

Tracking target setter 24 performs a process of displaying a person search screen (tracking target search screen) displaying the videos accumulated in recorder 2 on monitor 7, causing a monitoring person to designate a person which is a tracking person on the person search screen, and setting the designated person as the tracking target.

Inter-camera tracking processor 22 includes link score calculator 31, initial tracking information generator 32, candidate selector 33, and tracking information corrector 34.

Link score calculator 31 acquires the in-camera tracking information on each camera 1 from the tracking information storage, and calculates a link score (evaluation value) representing a high possibility that the persons who are detected and tracked in the in-camera tracking process of each camera 1 can be the same person. In this process, the link score is calculated based on the detection time of the person (the imaging time of the frame), the detection position of the person, the movement speed of the person, the color information of the person image, and the like.

Initial tracking information generator 32 performs a process of sequentially selecting for each camera 1, a person having the highest link score, that is, having a highest possibility of being the same person, with the person set as the tracking target by tracking target setter 24 as a starting point, from among the persons tracked by the in-camera tracking of camera 1 which is in the cooperation relationship, and generating initial tracking information in which those persons are associated as the same person.

Specifically, first, a person having the highest link score is selected from among the persons who are tracked by in-camera tracking of camera 1 which is in cooperative with camera 1 that captures an image (tracking target designating video) when the person is designated as the tracking target on the person search screen, and next, a person having the highest link score is selected from among the persons who are tracked by in-camera tracking of camera 1 which is in cooperative with camera 1 that captures the selected person. Such a person selection process is repeated for each camera 1 which is in a cooperation relationship. Such a person selection process is performed both before and after the tracking target designating video temporally, and when the highest link score becomes equal to or less than a predetermined threshold, it is determined that there is no person set as the tracking target in the monitoring area, and the selection of a person is ended.

Confirmation video presenter 25 performs a process of extracting the video of the person having the highest link score, that is, the video having the highest possibility of showing the person who is the tracking target as a confirmation video for each camera 1, based on the initial tracking information generated by initial tracking information generator 32, and presenting the confirmation video, specifically, displaying a timeline screen in a confirmation video display state (a tracking target confirmation screen, see FIG. 10) in which confirmation videos are arranged and displayed in order of imaging time, on monitor 7.

Candidate selector 33 of inter-camera tracking processor 22 performs a process of selecting a predetermined number of people whose link score is lower than the person corresponding to the confirmation video having an error, as a candidate person, from among the people who are tracked by in-camera tracking during a period corresponding to the confirmation video with an error, in a case where there is an error in the confirmation video presented by confirmation video presenter 25, that is, there is an error in the initial tracking information generated by initial tracking information generator 32.

At this time, a candidate person whose link score is equal to or higher than a predetermined threshold and whose tracking period is included in the search period which is set based on the tracking period (the period traced by the in-camera tracking) of the person corresponding to the confirmation video selected as having an error is selected. Incidentally, the setting information on the threshold of the link score and the time width for setting the search period are retained in the setting information holding unit (not shown) of PC 3.

Candidate video presenter 26 performs a process of extracting as a candidate video, the video related to the candidate person selected by candidate selector 33, that is, the video whose possibility of showing a person set as the tracking target is the next highest of the confirmation video, and presenting the candidate video, in a case where there is an error in the confirmation video presented by confirmation video presenter 25, specifically, a process of displaying on monitor 7, a timeline screen (a candidate selection screen, see FIG. 13) in a candidate video display state in which a predetermined number of candidate videos are displayed, and causing a candidate video showing the person set as the tracking target to be selected by the monitoring person on the screen.

In tracking information corrector 34 of inter-camera tracking processor 22 performs a process of correcting the tracking information on the person set as the tracking target such that the person corresponding to the candidate video is associated with the person set as the tracking target and generating the corrected tracking information, when there is an appropriate candidate video among the candidate videos presented by candidate video presenter 26.

At this time, similarly to the process of generating the initial tracking information, tracking information corrector 34 sequentially selects for each camera 1, a person having the highest link score, that is, having a highest possibility of being the same person, starting from the person corresponding to the candidate video, from among the persons tracked by the in-camera tracking of camera 1 which is in the cooperation relationship, and generates corrected tracking information in which those persons are associated as the same person. In the tracking information correction process, the person set by tracking target setter 24, the person corresponding to the confirmation video for which confirmation operation was confirmed by the monitoring person, and the person corresponding to the candidate video replaced with the confirmation video already having an error are excluded from the correction target.

Additional tracking target setter 27 performs a process of displaying on monitor 7, an additional person search screen (an additional tracking target search screen, see FIGS. 14 and 15) in which videos accumulated in recorder 2 are displayed, when there is no appropriate candidate video among candidate videos presented by candidate video presenter 26, causing a person set as a tracking target to be designated by the monitoring person, from among the videos during a period corresponding to the confirmation video with an error, on the additional person search screen, and setting the designated person as an additional tracking target.

Tracking information corrector 34 of inter-camera tracking processor 22 performs a process of associating the person set as the tracking target by additional tracking target setter 27 with the person set as the tracking target by tracking target setter 24, correcting tracking information on a person set as the tracking target, and generating corrected tracking information.

Video display period setter 28 performs a process of displaying on monitor 7, an additional person search screen in which videos accumulated in recorder 2 are displayed, when there is no appropriate candidate video among candidate videos presented by candidate video presenter 26, causing a period during which the person set as the tracking target is shown in the video to be designated by the monitoring person on the additional person search screen, and setting the period as a video display period.

Tracking information corrector 34 of inter-camera tracking processor 22 performs correction of adding the video display period set by video display period setter 28 to the tracking information on the person set as the tracking target, and generating corrected tracking information.

Video player 29 performs a process of displaying the video from camera 1 as a moving image on the screen displayed on monitor 7. In the present exemplary embodiment, a process of displaying the timeline screen (the continuous playback screen, see FIG. 11) in a continuous playback state on monitor 7 is performed, and continuous playback in which the video from each camera 1 showing the person who is the tracking target is sequentially displayed as a moving image with the lapse of time is performed on the timeline screen.

Screen generator 30 generates a screen to be displayed on monitor 7, specifically, generates a person search screen (tracking target search screen) (see FIGS. 6 and 7) in response to an instruction from tracking target setter 24, generates a timeline screen in a confirmation video display state (a tracking target confirmation screen, see FIG. 10) in response to an instruction from confirmation video presenter 25, generates a timeline screen in a candidate video display state (a candidate selection screen, see FIG. 13) in response to an instruction from candidate video presenter 26, and generates a timeline screen (a continuous playback screen, see FIG. 11) in the continuous playback state in response to an instruction from video player 29.

In addition, each unit of PC 3 shown in FIG. 3 is realized by causing a processor (CPU) of PC 3 to execute a tracking assistance program (instruction) stored in a memory such as an HDD. These programs may be installed in PC 3 which is an information processing device in advance and configured as a dedicated device, or may be provided to the user by being recorded in an appropriate program recording medium or through a network, as an application program operating on a predetermined OS.

Figure 4:
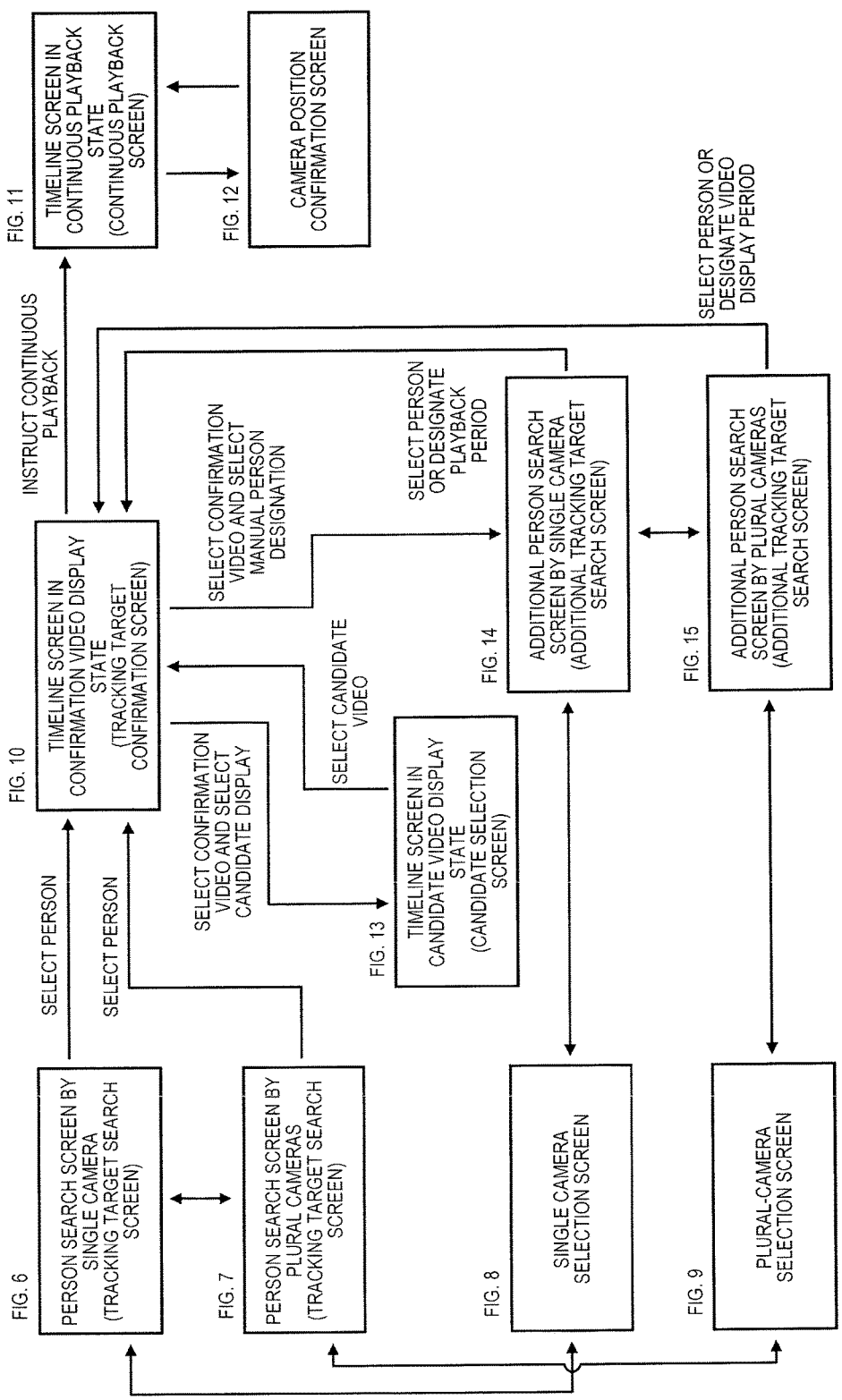
FIG. 4 is an explanatory diagram illustrating a transition status of a screen displayed on monitor 7.
Figure 5:
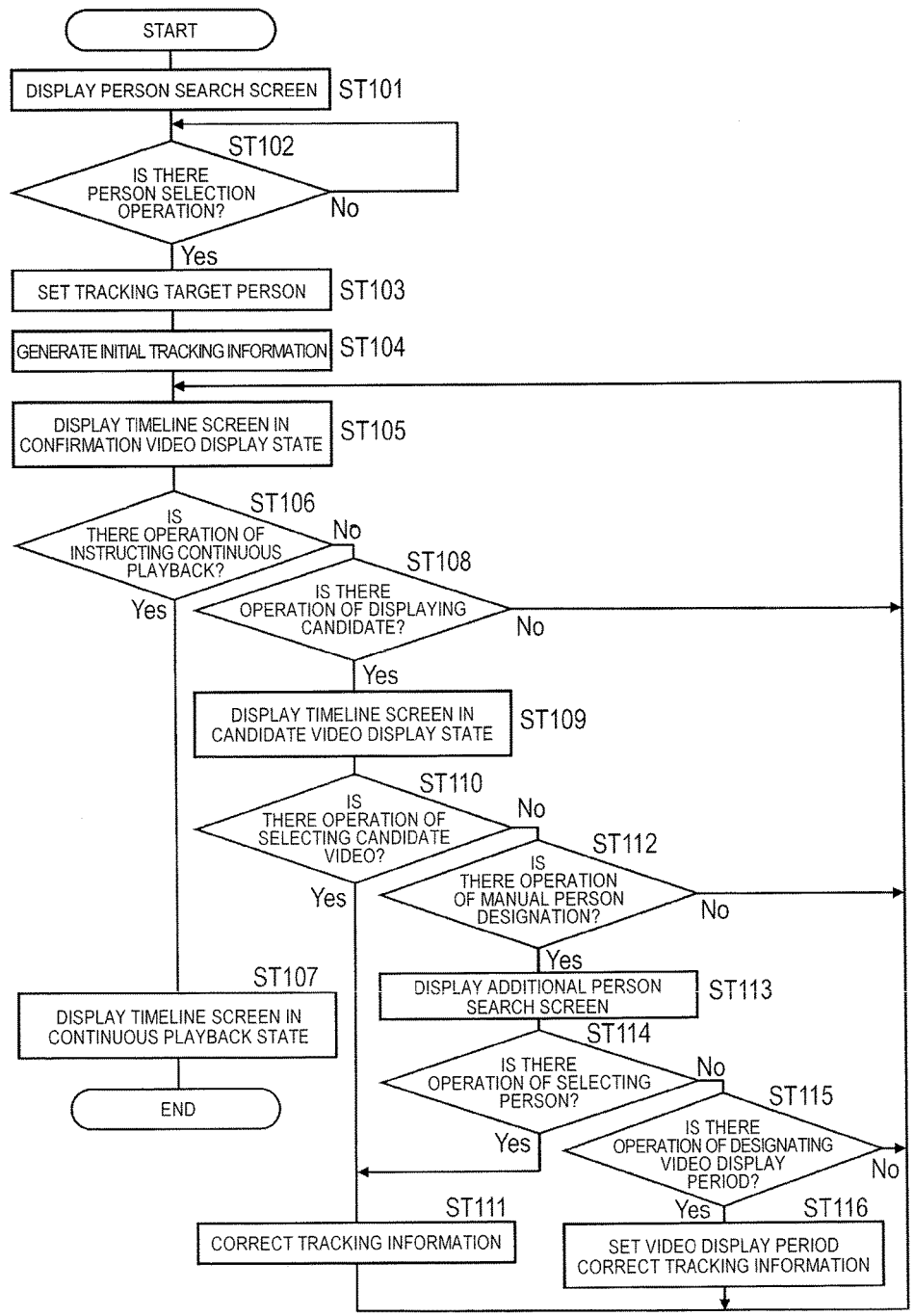
FIG. 5 is a flowchart showing a procedure of a process performed in each unit of PC 3 in response to an operation of a monitoring person performed on each screen.

Next, each screen displayed on monitor 7 shown in FIG. 1 and processes performed in each unit of PC 3 in response to the operation of the monitoring person performed on each screen will be described. FIG. 4 is an explanatory diagram illustrating a transition status of a screen displayed on monitor 7. FIG. 5 is a flowchart showing a procedure of a process performed in each unit of PC 3 in response to the operation of the monitoring person performed on each screen.

First, when the operation to start the tracking assistance process is performed in PC 3, a person search screen by a single camera or a person search screen by multiple cameras (tracking target search screen, see FIGS. 6 and 7) is displayed on monitor 7 (ST101).

The person search screen is used to designate the date and time when the person desired to be tracked performs a problematic action such as shoplifting, designate a place where the person desired to be tracked performs the problematic action, and camera 1 that captures an area through which the person is assumed to pass, find the video showing the person to be the tracking target, and designate the person to be the tracking target on the video. If the person to be the tracking target is shown in the displayed video by designating the date and time and camera 1, the monitoring person selects the person frame displayed on the person and designates the person who is the tracking target (Yes in ST102).

The person search screen includes a person search screen by a single camera and a person search screen by plural cameras. The person search screen by a single camera displays a video from single camera 1 and is used to find a video showing a person to be a tracking target. The person search screen by plural cameras 1 displays a video from plural cameras and is used to find a video showing a person to be a tracking target. When a camera selection operation is performed on these person search screens, a transition is made to a single camera selection screen or a plural camera selection screen. On the single camera selection screen, the monitoring person can select one camera 1 to display the video on the person search screen. On the plural camera selection screen, the monitoring person can select a plurality of cameras 1 to display the video on the person search screen. When camera 1 is selected on the single camera selection screen or the plural camera selection screen, the screen returns to the person search screen, and the video from the selected camera is displayed on the person search screen.

On the person search screen, when the monitoring person designates a person to be a tracking target, tracking target setter 24 performs a process of setting the person designated by the monitoring person to a tracking target (ST103). Next, in initial tracking information generator 32, a process of sequentially selecting for each camera, a person with the highest link score from the persons detected and tracked by the in-camera tracking process of each camera 1 and generating initial tracking information is performed (ST104). Then, in confirmation video presenter 25, a process of extracting the video having the highest possibility of showing the person set as the tracking target as a confirmation video for each camera 1, based on the initial tracking information, and displaying a timeline screen (a tracking target confirmation screen, see FIG. 10) in the confirmation video display state in which the confirmation video is displayed, on monitor 7 is performed (ST105).

The timeline screen (tracking target confirmation screen) in the confirmation video display state is used to cause the monitoring person to check whether there is an error in the inter-camera tracking information (initial tracking information) by the confirmation video. In a case where there is no error in all the confirmation videos displayed on the timeline screen in the confirmation video display state, that is, the person set as the tracking target is shown in all the confirmation videos and the person frame is displayed on the person, the operation of instructing the continuous playback is performed by the monitoring person (Yes in ST106), and a transition is made to the timeline screen (continuous playback screen, see FIG. 11) in the continuous playback state (ST107).

Continuous playback is performed in which the video from each camera 1 showing the tracking target is sequentially displayed with the lapse of time, on the timeline screen (continuous playback screen) in the continuous playback state.

On the other hand, in a case where a confirmation video with an error is found among the plurality of confirmation videos displayed on the timeline screen (tracking target confirmation screen) in the confirmation video display state, that is, the person set as the tracking target is not shown in one of the confirmation videos, or the person set as the tracking target is shown but the person frame indicating the tracking target is displayed on a person different from the person set as the tracking target, an operation of selecting the confirmation video and instructing the display of the candidate video is performed by the monitoring person (Yes in ST108).

Then, candidate selector 33 performs a process of selecting a predetermined number of people whose link score is lower than the person corresponding to the confirmation video from the top, and candidate video presenter 26 performs a process of extracting the video of a person selected as a candidate video by candidate selector 33 and displaying a timeline screen (a candidate selection screen, see FIG. 13) in a candidate video display state in which the candidate videos are arranged and displayed, on monitor 7 (ST109).

A predetermined number of videos whose possibility of showing the person set as the tracking target is the next highest of the confirmation video are displayed as the candidate video in a descending order, on the timeline screen (candidate selection screen) in the candidate video display state. In some cases, the person having the highest link score and the people having link scores lower than the highest may be captured by the same camera, and the candidate video may be captured by the same camera as the camera that captures the confirmation video.

In a case where there is an appropriate candidate video, among candidate videos displayed on the timeline screen in the candidate video display state, that is, a candidate video showing a person set as the tracking target is found, and a person frame is displayed on the person, the monitoring person performs an operation of selecting the candidate video (Yes in ST110).

Then, a process of correcting the tracking information such that the person corresponding to the candidate video selected on the timeline screen in the candidate video display state is associated with the person who is first designated as the tracking target is performed on tracking information corrector 34 of inter-camera tracking processor 22 (ST111). Then, the screen returns to the timeline screen (tracking target confirmation screen) in the confirmation video display state (ST107), and the result of correcting the tracking information is reflected, that is, the confirmation video of the timed screen is replaced with the candidate video and the candidate video is displayed, on the timeline screen.

On the other hand, in a case where there is no appropriate candidate video, among candidate videos displayed on the timeline screen in the candidate video display state, that is, a candidate video showing a person set as the tracking target is not found, or a candidate video showing a person set as the tracking target is found but the person frame is not displayed on the person, the monitoring person performs an operation of selecting a manual person designation (Yes in ST112), and a transition is made to an additional person search screen (an additional tracking target search screen, see FIGS. 14 and 15) (ST113).

The monitoring person designates date and time and camera 1 and finding a video showing the person set as the tracking target on the additional person search screen. Similar to the person search screen (tracking target search screen), the additional person search screen includes an additional person search screen by a single camera and an additional person search screen by plural cameras. If a camera selection operation is performed on these additional person search screens, a transition is made to a single camera selection screen or a plural camera selection screen, and if camera 1 is selected on the screens, the screen returns to the additional person search screen, and the video from the camera selected on the additional person search screen is displayed.

If a video showing the person set as the tracking target is found and the person frame Is displayed on the person, on the additional person search screen, that is, if the in-camera tracking of the person set as the tracking target is successful, the monitoring person performs an operation of selecting the person frame (Yes in ST114). Then, tracking information corrector 34 of inter-camera tracking processor 22 performs a process of correcting the tracking information such that the person selected on the additional person search screen is associated with the person who is first designated as the tracking target (ST111). Then, the screen returns to the timeline screen in the confirmation video display state (ST105), and the result of correcting the tracking information is reflected, that is, the confirmation video of the timed screen is replaced with the video of the person designated on the additional person search screen, and the replaced video is displayed on the timeline screen.

On the other hand, in a case where a video showing the person set as the tracking target is found but the person frame is not displayed on the person, on the additional person search screen, that is, the in-camera tracking of the person set as the tracking target is failed, the monitoring person performs an operation of designating a period during which the person set as the tracking target is shown in the video on the additional person search screen as a video display period (Yes in ST115). Then, in video display period setter 28, a process of setting the video display period is performed in video display period setter 28, and then a correction is made to add the video display period to the tracking information on the person set as the tracking target, in tracking information corrector 34 (ST116). Then, the screen returns to the timeline screen in the confirmation video display state (ST105), and the result of correcting the tracking information is reflected, that is, the confirmation video of the timed screen is replaced with the video of the video display period designated on the additional person search screen, and the replaced video is displayed on the timeline screen.

As described above, in a case where there is an error in the confirmation video displayed on the timeline screen in the confirmation video display state, the monitoring person performs an operation of designating a candidate video, an operation of finding and designating a person set as the tracking target, or an operation of entering the video display period during which the person set as the tracking target is shown in the video, and these operations are repeated until there is no confirmation video with an error. When it is checked that there is no error in all the confirmation videos, the monitoring person performs an operation of instructing continuous playback (Yes in ST106), and a timeline screen in a continuous playback state (continuous playback screen) (see FIG. 11) is displayed on monitor 7 (ST107).

Hereinafter, each screen shown in FIG. 4 will be described in detail.

Figure 6:
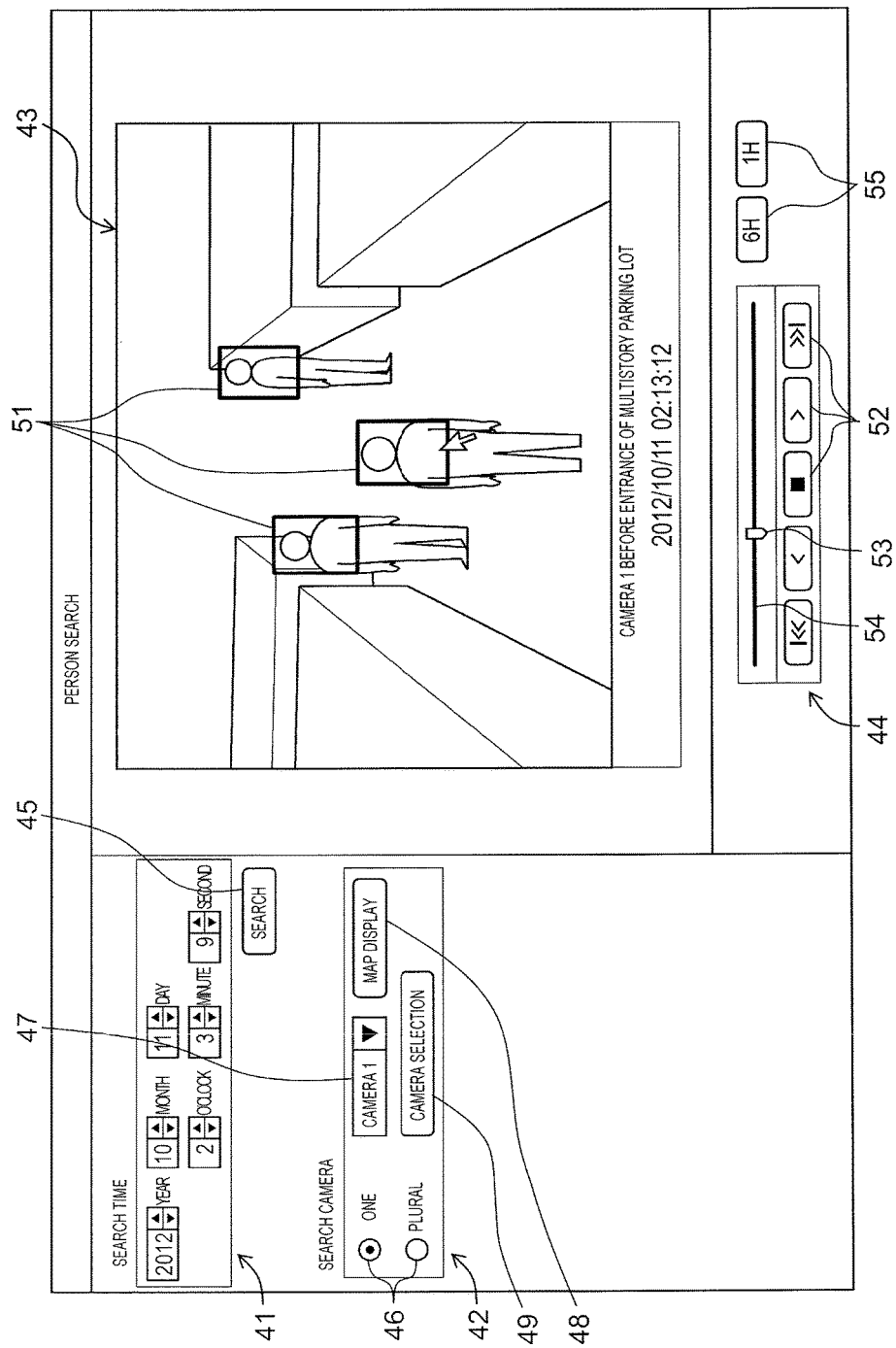
FIG. 6 is an explanatory diagram illustrating a person search screen by a single camera displayed on monitor 7.
Figure 7:
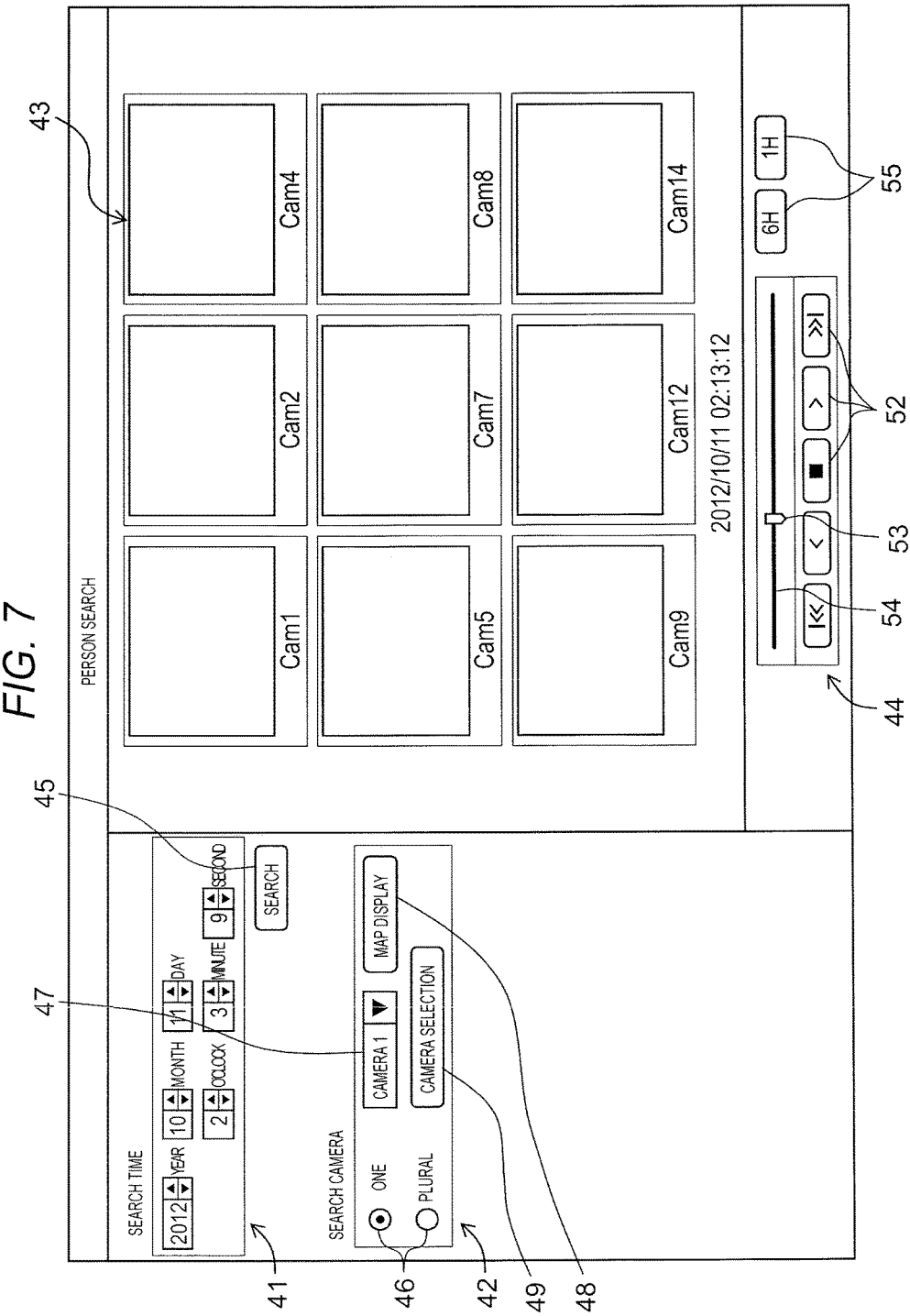
FIG. 7 is an explanatory diagram illustrating a person search screen by plural cameras displayed on monitor 7.

First, the person search screen by a single camera and the person search screen (tracking target search screen) by a plurality of cameras shown in FIG. 4 will be described. FIGS. 6 and 7 are explanatory diagrams illustrating the person search screen by a single camera and the person search screen by plural cameras, displayed on monitor 7, respectively.

As shown in FIGS. 6 and 7, the person search screen (tracking target search screen) is used to designate the date and time when the person desired to be tracked performs a problematic action such as shoplifting to find the video showing the person to be the tracking target, and designate the person to be the tracking target on the video, and includes search date and time designation portion 41, search camera designation portion 42, video display portion 43, and playback operation portion 44.

In search date and time designation portion 41, the monitoring person designates the date and time that is the center of the period during which the person to be a tracking target is assumed to be shown. If the date and time is designated in search date and time designation portion 41 and search button (search instructing portion) 45 is operated, the video at the designated date and time is displayed on video display portion 43.

In search camera designation portion 42, the monitoring person selects camera 1 according to the search mode (single camera mode and plural camera mode). In the single camera mode, single camera 1 is designated, and a video showing the person to be the tracking target is found from among the videos from single camera 1. In the plural camera mode, plural cameras 1 are designated, and a video showing the person to be the tracking target is found from among the videos from plural cameras 1.

Search mode selection portion (radio button) 46, camera selection portion 47, map display button 48, and camera selection button 49 are provided in search camera designation portion 42.

In search mode selection portion 46, one of the single camera mode and the plural camera mode is selected. In camera selection portion 47, single camera 1 is selected by using a pull-down menu. If map display button 48 is operated, a single camera selection screen (see FIG. 8) is displayed, and the position of the selected camera can be confirmed, and the selected camera can be changed to another camera 1, on the single camera selection screen. If camera selection button 49 is operated, a plural camera selection screen (see FIG. 9) is displayed, and plural cameras 1 can be selected on the plural camera selection screen.

Information on the selection state of the search mode (the single camera mode and the plural camera mode) and the selection state of camera 1 is retained in an information storage unit not shown, and at the next start-up, a person search screen by a single camera or a person search screen by plural cameras is displayed, with the search mode and camera 1 which was selected at the time of the previous termination.

When the single camera mode is selected, the date and time and the camera are designated, and search button 45 is operated, the person search screen by a single camera shown in FIG. 6 is displayed. The video from designated single camera 1 is displayed in video display portion 43, on the person search screen by a single camera. On the other hand, when the plural camera mode is selected, the date and time and the camera are designated, and search button 45 is operated, the person search screen by plural cameras shown in FIG. 7 is displayed. The videos from designated plurality of cameras 1 are arranged and displayed in video display portion 43, on the person search screen by plural cameras.

In video display portion 43, the video from camera 1, the name of camera 1, and the date and time, that is, the imaging time of the video are displayed.

As shown in FIG. 6, in video display portion 43, person frame 51 is displayed in the image area of the person detected in the video displayed therein, that is, the person to be subjected to the in-camera tracking process, and an operation of selecting person frame 51 is performed, such that the person is set as the tracking target. The person frame is displayed on the video from camera 1 in the same way, on the person search screen by plural cameras shown in FIG. 7.

Playback operation portion 44 is used to perform operations related to the playback of the video displayed in video display portion 43. Various buttons 52 such as playback, reverse playback, stop, fast forward, and rewind are provided in playback operation portion 44, and it is possible to efficiently view videos and to efficiently find the video showing the person to be the tracking target, by operating buttons 52.

Slider (display time adjustment portion) 53 for adjusting the display time of the video displayed in video display portion 43 is provided in playback operation portion 44, and it is possible to perform switching to the video at a desired time by operating slider 53. Specifically, when an operation of shifting (dragging) slider 53 is performed using input device 6 such as a mouse, the video at the time indicated by slider 53 is displayed on video display portion 43. Slider 53 is provided so as to be movable along bar 54, and bar 54 defines an adjustment range of the display time centered on the time designated in search date and time designation portion 41.

Adjustment range designation button (adjustment range designation portion) 55 is provided in playback operation portion 44, and the movement range of slider 53 defined by bar 54, that is, the adjustment range of the display time can be designated by using adjustment range designation button 55. In the illustrated example, the display time adjustment range can be switched between 1 hour and 6 hours.

Figure 8:
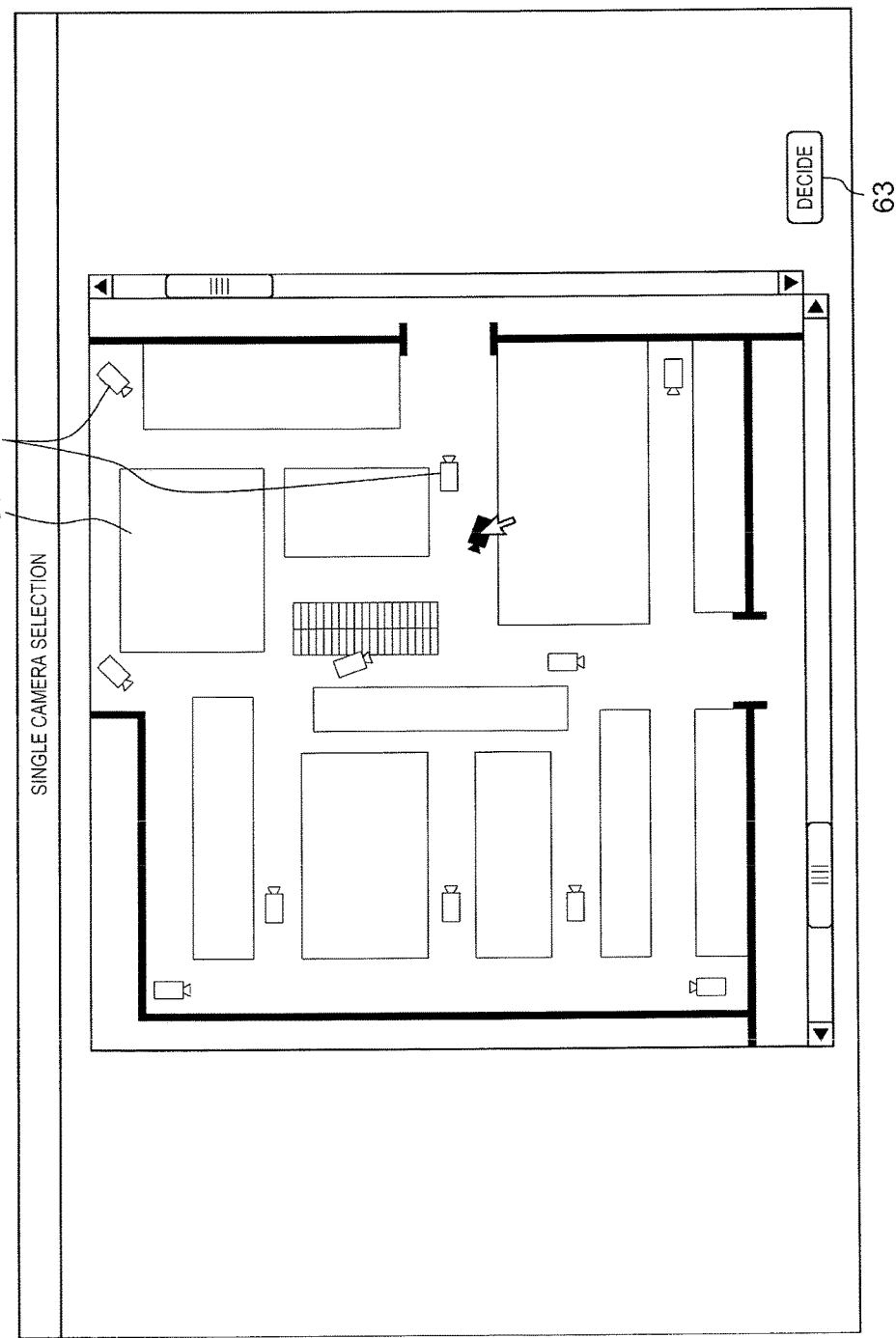
FIG. 8 is an explanatory diagram illustrating a single camera selection screen displayed on monitor 7.

Next, the single camera selection screen shown in FIG. 4 will be described. FIG. 8 is an explanatory diagram illustrating a single camera selection screen displayed on monitor 7.

If the single camera mode is selected in search mode selection portion 46 on the person search screen (see FIGS. 6 and 7), and map display button 48 is operated, the single camera selection screen shown in FIG. 8 Is displayed.

The single camera selection screen is used for the monitoring person to select one camera to display videos on the person search screen by a single camera (see FIG. 6), and camera icons (videos showing cameras 1) 62 for a plurality of cameras 1 are superimposed and displayed on map image 61 showing the layout in the store (state of the monitoring area). Camera icon 62 is displayed in an inclined manner so as to indicate the imaging direction of camera 1, such that the monitoring person can roughly recognize the imaging area of camera 1.

When camera icon 62 is selected on the single camera selection screen, camera icon 62 changes to the selected state. When camera 1 is selected in camera selection portion 47 of the person search screen (see FIG. 6) and map display button 48 is operated, camera icon 62 related to the selected camera is displayed in the selected state on the single camera selection screen, such that the position of the selected camera can be checked, and camera 1 can be changed to another camera 1.

In PC 3, camera setting information on the coordinates and the orientation of camera icon 62, and image information on camera icon 62 corresponding to the presence or absence of selection are held in an information holding unit (not shown), and based on the information, camera icon 62 corresponding to the presence or absence of selection is displayed at the position and orientation corresponding to the actual placement state of camera 1.

If camera icon 62 is selected and decision button 63 is operated on the single camera selection screen, camera 1 to be displayed on the person search screen is confirmed, and the video from camera 1 is displayed on the person search screen.

Figure 9:
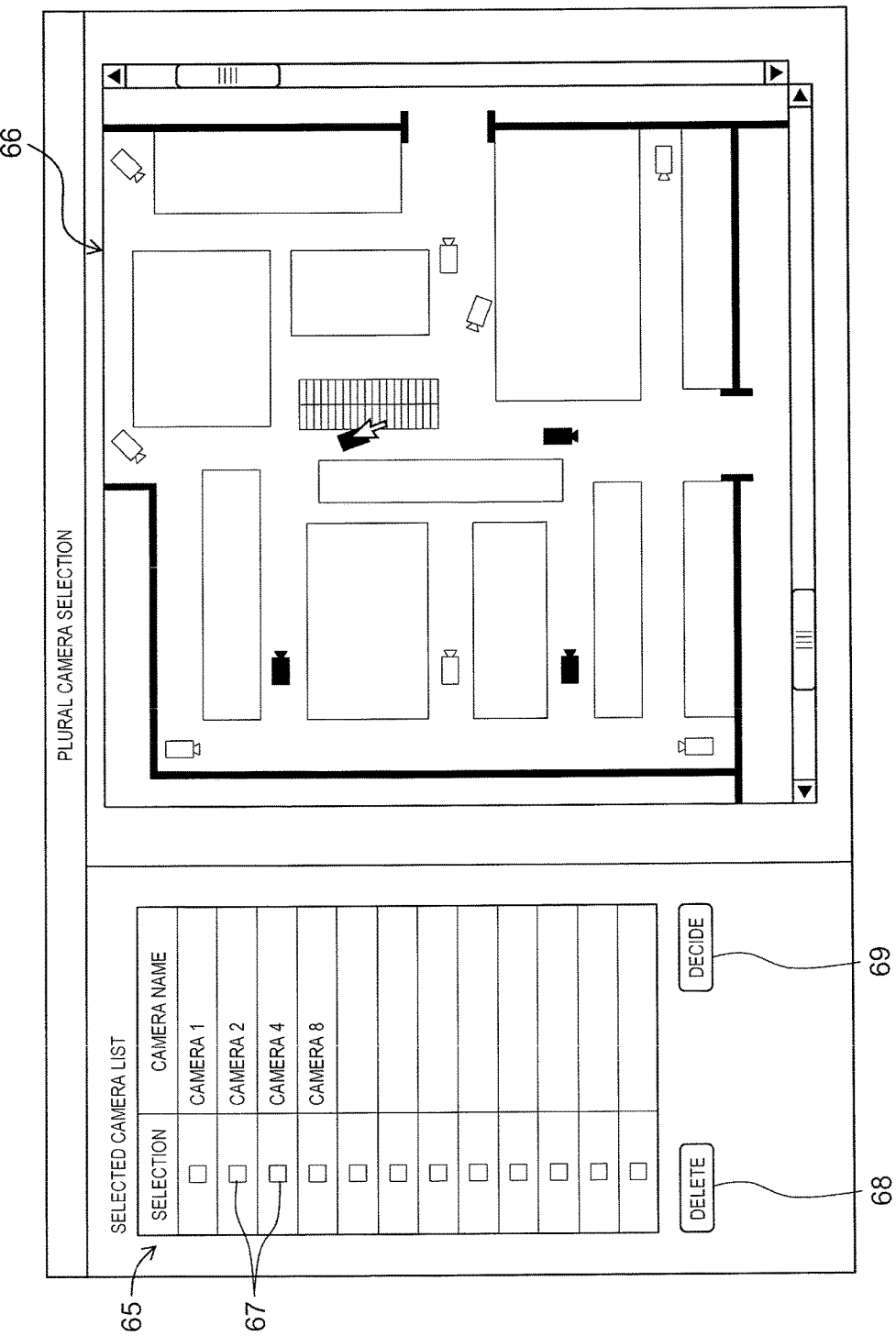
FIG. 9 is an explanatory diagram illustrating a plural camera selection screens displayed on monitor 7.

Next, the plural camera selection screen shown in FIG. 4 will be described. FIG. 9 is an explanatory diagram illustrating the plural camera selection screen displayed on monitor 7.

If the plural camera mode is selected in search mode selection portion 46 on the person search screen (see FIGS. 6 and 7) and camera selection button 49 is operated, the plural camera selection screen shown in FIG. 9 is displayed.

The plural camera selection screen is used for the monitoring person to select a plurality of cameras to display videos on the person search screen by plural cameras (see FIG. 7), and includes selected camera list display portion 65, and camera selection unit 66.

In selected camera list display portion 65, a list of selected cameras 1 is displayed. Camera selection unit 66 is similar to the single camera selection screen shown in FIG. 8.

If camera icon 62 is selected in camera selection unit 66, camera 1 corresponding to selected camera icon 62 is added to selected camera list display portion 65. When camera 1 is selected in check box 67 and delete button 68 is operated, selected camera 1 is deleted. When decision button 69 is operated, camera 1 displayed on selected camera list display portion 65 is determined as camera 1 to be displayed on the person search screen (see FIG. 7), and the video from camera 1 is displayed on the person search screen.

Next, the timeline screen (tracking target confirmation screen) in a confirmation video display state shown in FIG.

Figure 10:
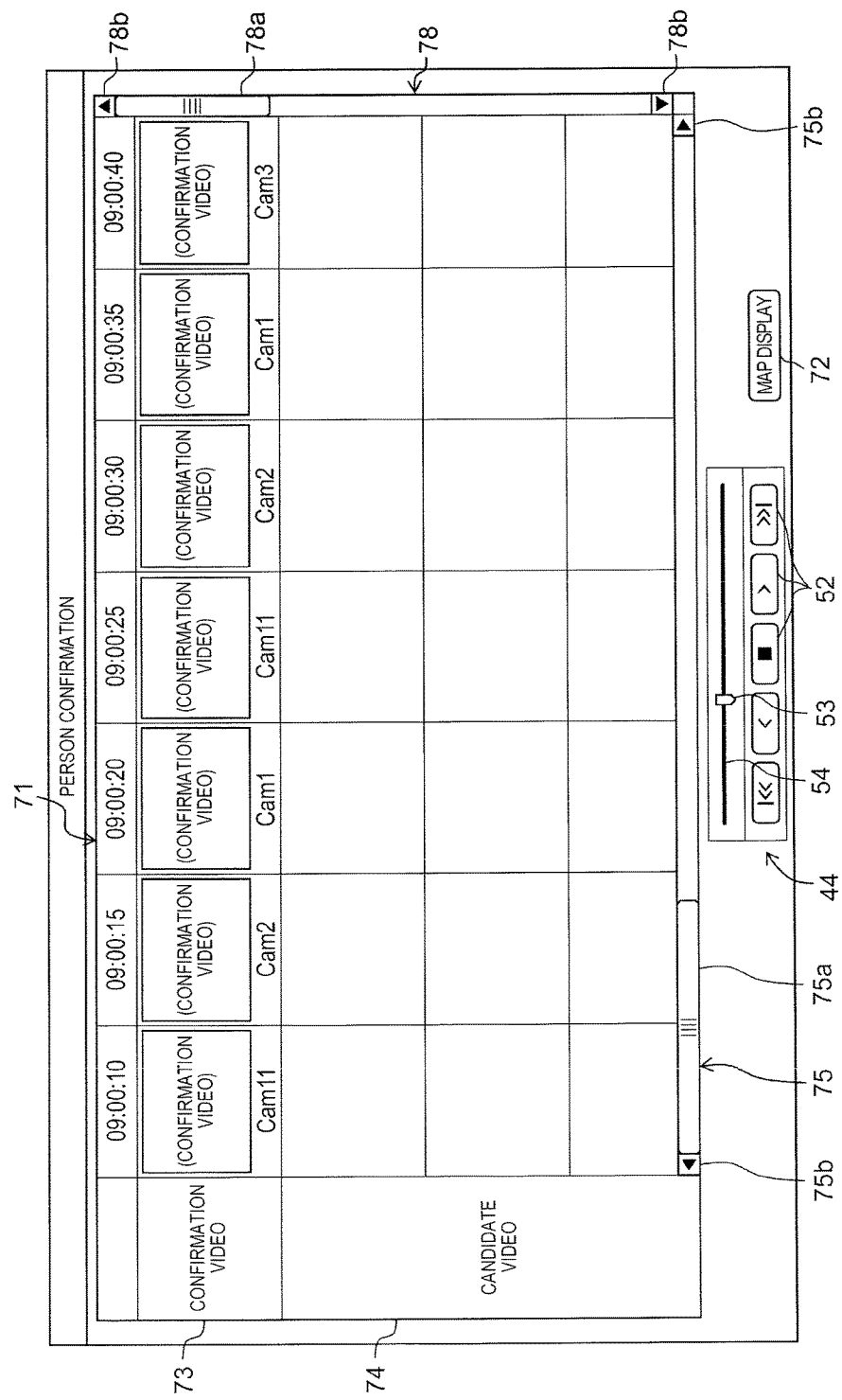
FIG. 10 is an explanatory diagram illustrating a time line screen in a confirmation video display state displayed on monitor 7.

4 will be described. FIG. 10 is an explanatory diagram illustrating a time line screen in a confirmation video display state displayed on monitor 7.

If a monitoring person performs an operation of designating a person to be a tracking target on the person search screen (see FIGS. 6 and 7), the timeline screen in the confirmation video display state shown in FIG. 10 is displayed.

The timeline screen in a confirmation video display state displays the video from each camera having the highest possibility of showing the person designated as the tracking target on the person search screen as a confirmation video to cause the monitoring person to check whether there is an error in the inter-camera tracking information (initial tracking information) by using the confirmation video, and includes video display unit 71, playback operation portion 44, and map display button 72. Playback operation portion 44 which is similar to the person search screen (see FIGS. 6 and 7) and is used to display videos as a moving image on the timeline screen (see FIG. 11) in a continuous playback state will be described in detail later.

Confirmation video viewer 73 and candidate video viewer 74 are provided in video display portion 71. Videos are displayed in candidate video viewer 74, on the timeline screen (see FIG. 13) in a candidate video display state, and candidate video viewer 74 will be described in detail later.

In confirmation video viewer 73, confirmation videos are arranged and displayed in order of imaging time, and confirmation videos from entering the monitoring area (in the store) and starting the tracking until exiting the monitoring area are arranged and displayed from the left end in order of imaging time. In confirmation video viewer 73, the imaging time of each confirmation video and the name of camera 1 that captures each confirmation video are displayed. In the initial state when the timeline screen is opened, the confirmation video at the tracking start time when in-camera tracking is started by camera 1 is displayed as a still video. When there is no error in the confirmation video, a transition can be made to the continuous playback in response to the operation of playback operation portion 44. In the confirmation video, the person frame is displayed on the person detected and traced from the confirmation video, similar to the person search screen (see FIG. 6).

In confirmation video viewer 73, a tracking target designated video, that is, a video in which a person is designated as a tracking target on the person search screen (see FIGS. 6 and 7) is displayed, and a frame video indicating that the video is a tracking target designated video may be displayed such that the tracking target designated video can be identified. A frame image representing the confirmed state may be displayed in the confirmed confirmation video.

First scroll bar (scroll operation portion) 75 is provided in video display unit 71. When all confirmation videos do not fit in confirmation video viewer 73 (the display area of the confirmation video), first scroll bar 75 is used to slide and display the confirmation video in the arrangement direction of the confirmation video, that is, in the horizontal direction, the confirmation video can be slid in the horizontal direction by dragging knob 75a, and the confirmation video can be slid in the directions of arrows 75b by clicking arrows (left and right arrows) 75b, together with knob 75a by one unit (one confirmation video).

If an operation (right click) of selecting the confirmation video is performed in confirmation video viewer 73, a confirmation video display screen (not shown) displaying the confirmation video in an enlarged manner is displayed in a separate window, and the confirmation video can be observed in detail on the screen.

Since it is determined whether the confirmation video displayed in confirmation video viewer 73 belongs to the person designated as the tracking target, on the timeline screen in the confirmation video display state configured in this way, the monitoring person can check whether or not there is an error in the inter-camera tracking information (initial tracking information) regarding the person designated as the tracking target. In a case where there is an error in the inter-camera tracking information, the person set as the tracking target is not shown in the confirmation video, or the person set as the tracking target is shown but the person frame is displayed on a person different from the person set as the tracking target, and the monitoring person can check whether or not there is an error in the inter-camera tracking information by viewing the confirmation video.

Here, in a case where there is no error in all the confirmation videos displayed on confirmation video viewer 73, that is, the person set as the tracking target is shown in all the confirmation videos, and the person frame is displayed on the person, the operation of instructing continuous playback, that is, playback button 52 in playback operation portion 44 is operated. A transition is made to the timeline screen in a continuous playback state shown in FIG. 11.

Figure 11:
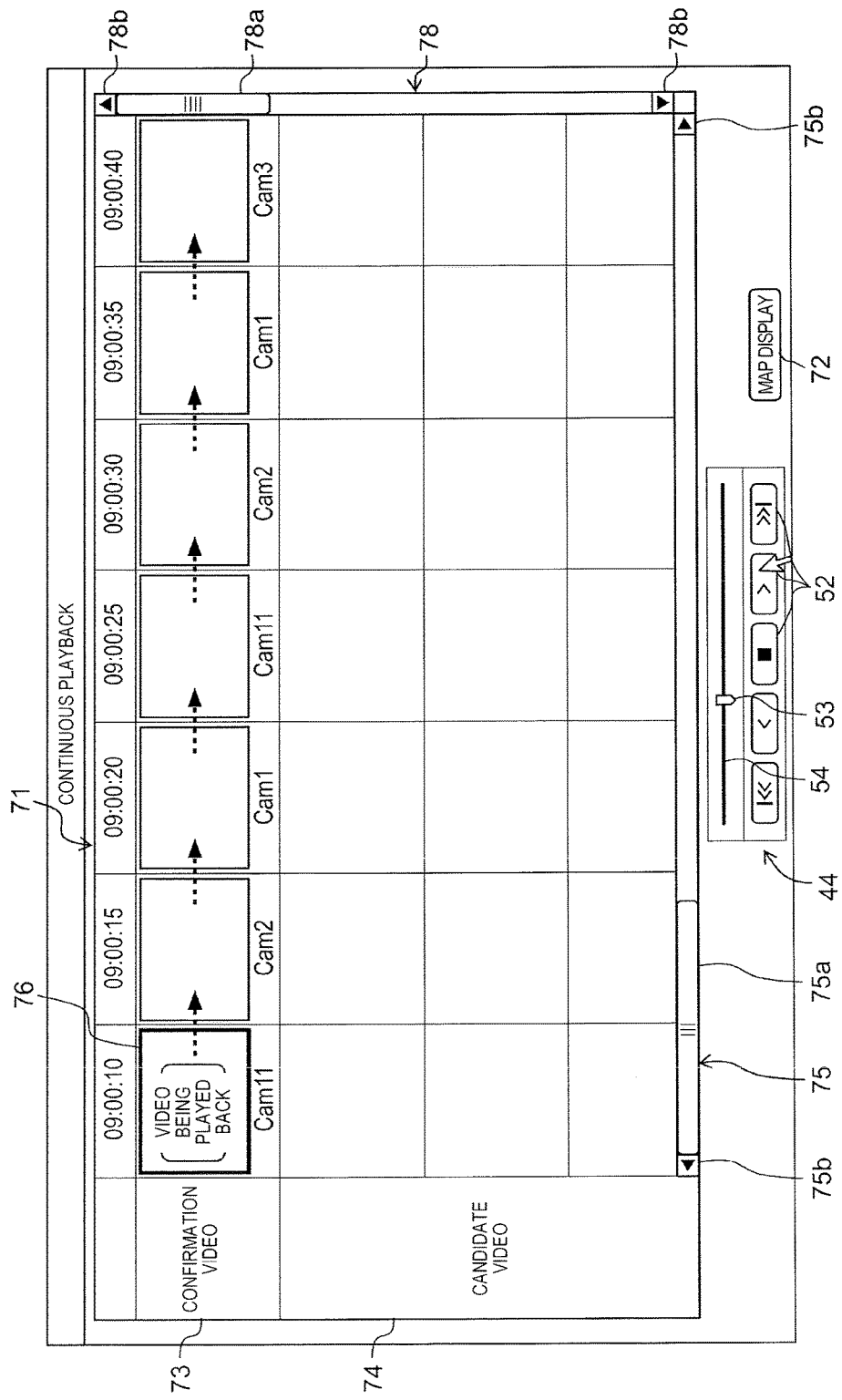
FIG. 11 is an explanatory diagram illustrating a timeline screen in a continuous playback state displayed on monitor 7.

Next, the timeline screen (continuous playback screen) in a continuous playback state shown in FIG. 4 will be described. FIG. 11 is an explanatory diagram illustrating a timeline screen in a continuous playback state displayed on monitor 7.

Although the timeline screen in the continuous playback state has substantially the same configuration as the timeline screen in the confirmation video display state (see FIG. 10), continuous playback is performed in which the confirmation video displayed by confirmation video viewer 73 is sequentially displayed as a moving image with the lapse of time, on the timeline screen in the continuous playback state. Frame image 76 indicating that playback is in progress is displayed on the confirmation video being played back.

In playback operation portion 44, the start point (left end) of bar 54 that defines the movement range of slider 53 for adjusting the display time of the confirmation video displayed in video display portion 71, that is, the adjustment range of the display time is the start time of the confirmation video having the earliest imaging time, and the end point (right end) of bar 54 is the end time of the confirmation video having the latest imaging time.

Here, the video display period in which the video from each camera is displayed as a moving image is the period during which the person frame is displayed, that is, the period during which the person is detected and traced in the in-camera tracking for each camera. If the video display periods do not match in the preceding and subsequent videos, that is, if there is a time lag between the end time of the preceding video and the start time of the subsequent video, a process of temporally connecting video display periods by extending the preceding and subsequent periods is performed. The video display periods overlap in the preceding and subsequent videos in some cases, and in this case, the preceding and subsequent videos are played in parallel with each other. Thus, at the time of continuous playback, one or two videos are always played back.

Since the confirmation videos are arranged and displayed sequentially from the left starting from the confirmation video having the earliest imaging time on the timeline screen in the continuous playback state, the confirmation video is played back sequentially from the left during continuous playback, but if all the confirmation videos do not fit in confirmation video viewer 73, a process of automatically sliding the confirmation videos at an appropriate timing is performed, so the monitoring person can view all the confirmation videos which are continuously played back, without performing any special operation. If an operation (right click) of selecting the confirmation video in confirmation video viewer 73 is performed, a confirmation video display screen (not shown) displaying the confirmation video in an enlarged manner is displayed in a separate window, and the confirmation video is enlarged and displayed as a moving image on the screen. During continuous playback, when an operation of selecting the confirmation video display screen (separate window) enlarging and displaying the confirmation video is performed, the enlarged display is set to the effective state for all subsequent confirmation videos, and enlarged videos may be continuously played back in one or two separate windows.

Figure 12:
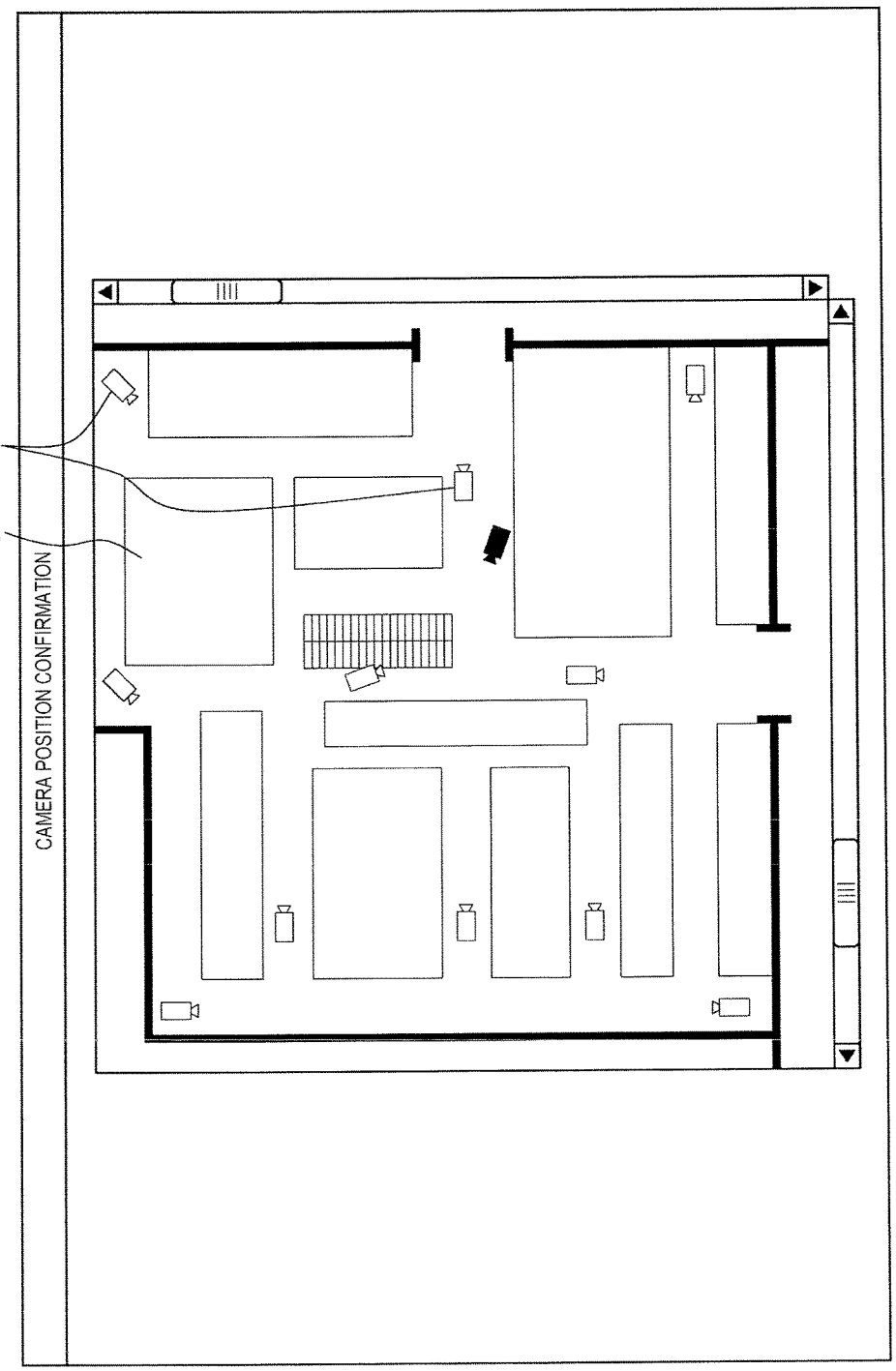
FIG. 12 is an explanatory diagram illustrating a camera position confirmation screen displayed on monitor 7.

Next, the camera position confirmation screen shown in FIG. 4 will be described. FIG. 12 is an explanatory diagram illustrating a camera position confirmation screen displayed on monitor 7.

If map display button 72 is operated in a state where the confirmation video is continuously played back on the timeline screen (see FIG. 11) in a continuous playback state, the camera position confirmation screen shown in FIG. 12 is displayed.

This camera position confirmation screen is used to check the position of camera 1 that captures the video being played back on the timeline screen in the continuous playback state, and similarly to the camera selection screen (see FIG. 8), camera icons (videos showing cameras) 62 for a plurality of cameras 1 are superimposed and displayed and camera icon 62 corresponding to camera 1 which captures a video being played back is displayed in a different display form such as changing the display color so as to be identifiable from camera icon 62 corresponding to other cameras 1, on map image 61 showing the layout of camera 1 (the state of the monitoring area).

The camera position confirmation screen can also be displayed on the timeline screen (see FIG. 10) in the confirmation video display state in the same way, and if a confirmation video is selected on the timeline screen in the confirmation video display state, and display button 72 is operated, the position of camera 1 which images the selected confirmation video is displayed on the camera position confirmation screen.

Figure 13:
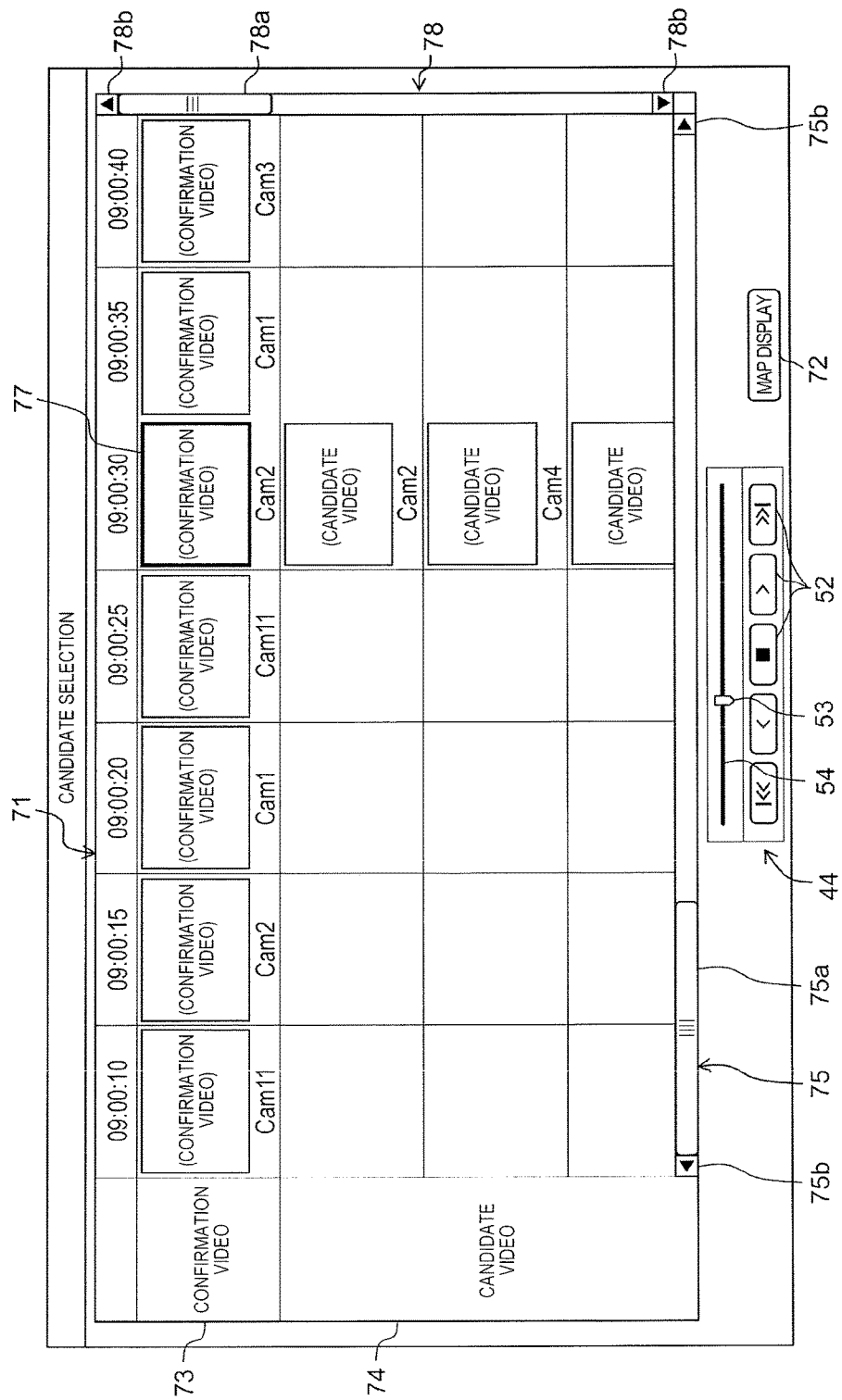
FIG. 13 is an explanatory diagram illustrating a timeline screen in a candidate video display state displayed on monitor 7.

Next, the timeline screen (candidate selection screen) in the candidate video display state shown in FIG. 4 will be described. FIG. 13 is an explanatory diagram illustrating a timeline screen in a candidate video display state displayed on monitor 7.

In a case where a confirmation video with an error is found among the plurality of confirmation videos displayed on the timeline screen (see FIG. 10) in the confirmation video display state, that is, the person set as the tracking target is not shown in one of the confirmation videos, or the person set as the tracking target is shown but the person frame indicating the tracking target is displayed on a person different from the person set as the tracking target, an operation of selecting the confirmation video is performed by the monitoring person, and the timeline screen in the candidate video display state shown in FIG. 13 is displayed.

On the timeline screen (candidate selection screen) in the candidate video display state, a video whose possibility of showing the person set as the tracking target is the next highest of the confirmation video is displayed as candidate videos so as to be selected by the monitoring person, in a case where there is an error in the confirmation videos displayed on the timeline screen (see FIG. 10) in the confirmation video display state.

The timeline screen in the candidate video display state is almost the same as the timeline screen in the confirmation video display state (see FIG. 10), but a predetermined number of candidate videos are displayed in a row in a descending order of the link score, below the confirmation video selected as having an error, on candidate video viewer 74. If a confirmation video with an error is selected on the timeline screen (see FIG. 10) in the confirmation video display state, frame image 77 indicating the selected state is displayed on the confirmation video, in a predetermined display color (for example, yellow).

Second scroll bar (scroll operation portion) 78 is provided in video display unit 71. When all the candidate videos do not fit in candidate video viewer 74 (the display area of a candidate video), second scroll bar 78 is used to slide and display the candidate video in the arrangement direction of the candidate video, that is, in the vertical direction, the candidate video can be slid in the vertical direction by dragging knob 78a, and the candidate video can be slid in the directions of arrows 78b by clicking arrows (up and down arrows) 78b, together with knob 78a by one unit (one candidate video).

If an operation (right click) of selecting the candidate video is performed in candidate video viewer 74, a candidate video display screen (not shown) displaying the candidate video in an enlarged manner is displayed, and the candidate video can be observed in detail on the screen.

In a case where there is an appropriate candidate video, among candidate videos displayed in candidate video viewer 74 on the timeline screen in the candidate video display state, that is, a candidate video showing a person set as the tracking target is found, and a person frame Is displayed on the person, the monitoring person performs an operation (left click) of selecting the candidate video.

Then, a process of correcting the tracking information such that the person corresponding to the candidate video selected on the timeline screen in the candidate video display state is associated with the person who is designated as the tracking target on the person search screen (see FIGS. 6 and 7) is performed in tracking information corrector 34 of inter-camera tracking processor 22. Then, the timeline screen (see FIG. 10) in a confirmation video display state is displayed on monitor 7 in a state where the result of correcting the tracking information is reflected.

The result of correcting the tracking information is reflected on the timeline screen in the confirmation video display state, that is, the confirmation video selected as having an error on the timeline screen in the confirmation video display state is replaced with the candidate video selected on the timeline screen in the candidate video display state and displayed. As the confirmation video having an error is replaced with the candidate video, the preceding and subsequent confirmation videos of the replaced confirmation video may be changed. That is, in tracking information corrector 34, a process of sequentially selecting a person having the highest link score for each camera 1 is performed, with a person corresponding to the candidate video as a starting point. When the selected person is different from the person corresponding to the confirmation video, the replacement of the person occurs and the confirmation video is changed accordingly. When tracking information is corrected in tracking information corrector 34, the person set in tracking target setter 24, the person corresponding to the confirmation video for which confirmation operation was confirmed by the monitoring person, and the person corresponding to the candidate video replaced with the confirmation video already having an error are excluded from the correction target, so the confirmation video regarding those persons is not changed.

In the present exemplary embodiment, an appropriate candidate video is selected on the timeline screen in a candidate video display state, but a person frame on the candidate video may be selected. In this way, it is possible to avoid the tracking information from being corrected by the wrong person.

Figure 14:
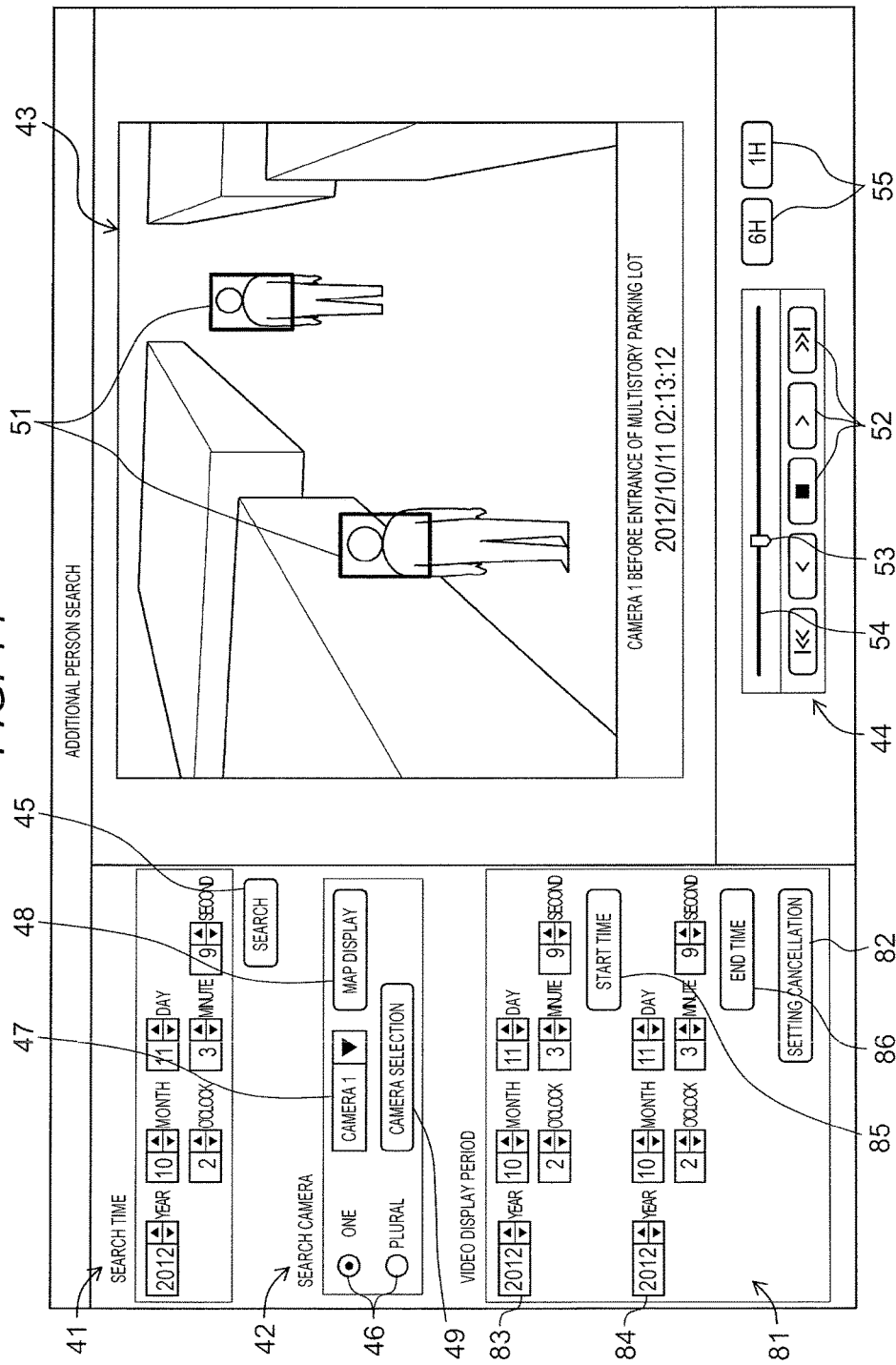
FIG. 14 is an explanatory diagram illustrating an additional person search screen by a single camera displayed on monitor 7.

On the other hand, in a case where there is no appropriate candidate video, among candidate videos displayed on the timeline screen in the candidate video display state, that is, a candidate video showing a person set as the tracking target is not found, or a candidate video showing a person set as the tracking target is found but the person frame is not displayed on the person, if an operation (right click) of displaying the menu on the confirmation video selected as having an error is performed and manual person designation is selected, the additional person search screen shown in FIG. 14 is displayed.

Figure 15:
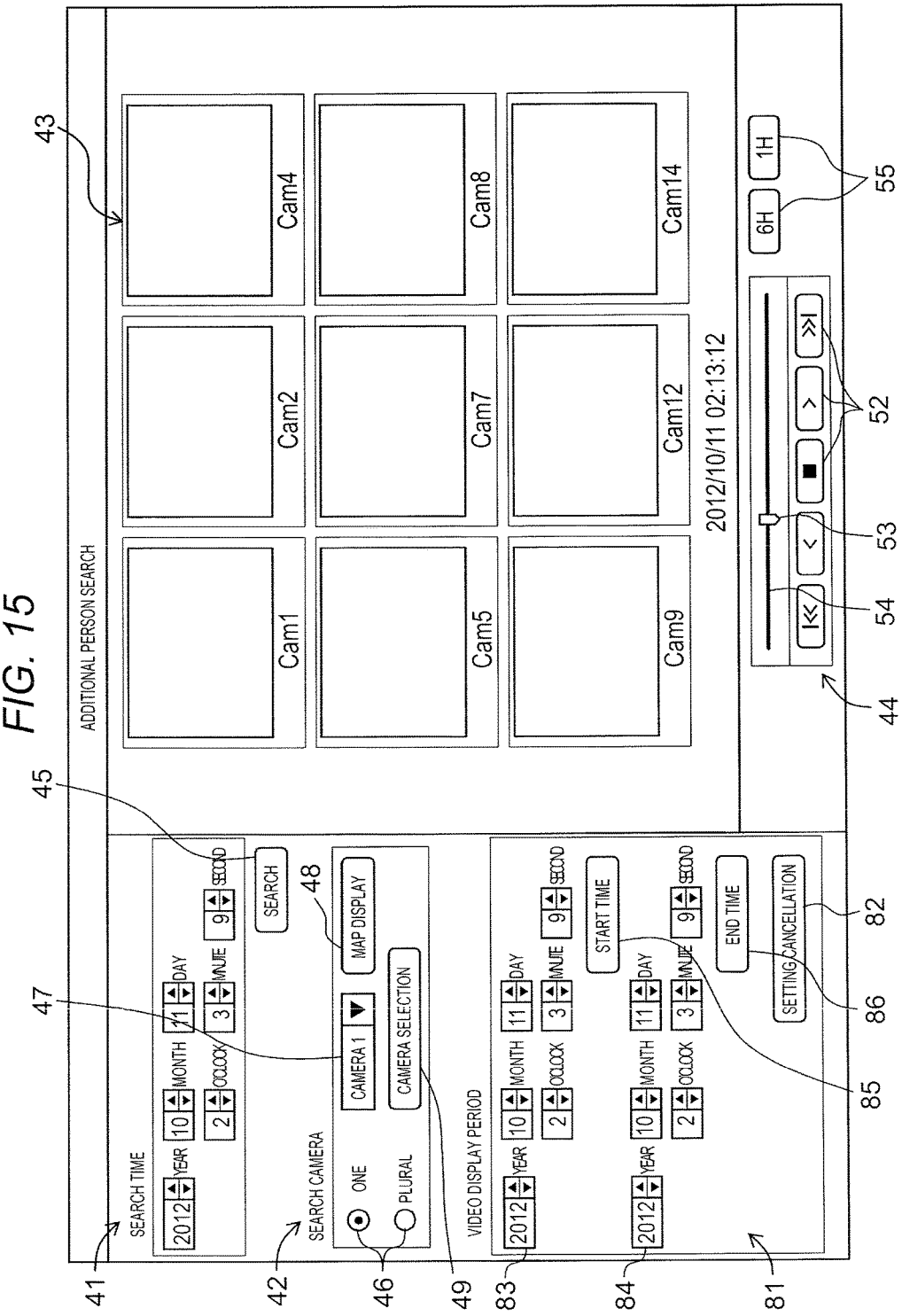
FIG. 15 is an explanatory diagram illustrating an additional person search screen by plural cameras displayed on monitor 7.

Next, the additional person search screen by a single camera and the additional person search screen (additional tracking target search screen) by a plurality of cameras shown in FIG. 4 will be described. FIGS. 14 and 15 are explanatory diagrams illustrating the additional person search screen by a single camera and the additional person search screen by plural cameras, which are displayed on monitor 7, respectively.

The additional person search screen (additional tracking target search screen) shown in FIGS. 14 and 15 plays back the videos of the period corresponding to the confirmation video having an error and used to find a person, when there is no appropriate candidate video among the candidate videos displayed on the timeline screen (see FIG. 13) in the candidate video display state.

As described above, in a case where a predetermined number of videos of persons whose link score is the next highest of the link score of the person in the confirmation video are displayed as the candidate videos in a descending order on the timeline screen (see FIG. 13) in the candidate video display, and there is no candidate video showing the person set as the tracking target, that is, there is no person set as the tracking target among the persons with a relatively high score, it is possible to find a person set as the tracking target from the persons with a low link score, during a period corresponding to the confirmation video with an error, on the additional person search screen.

Search date and time designation portion 41, search camera designation portion 42, video display portion 43, and playback operation portion 44 are provided in the additional person search screen (additional tracking target search screen), similar to the person search screen (see FIGS. 6 and 7), but video display period designation unit 81 is provided on the additional person search screen.

Search date and time designation portion 41 is used to designate a search time, as in the person search screen (see FIGS. 6 and 7), but in an initial state of the additional person search screen which is displayed when the confirmation video with an error is selected the timeline screen (see FIG. 13) in the candidate video display state and an operation of displaying the additional person search screen is performed, the start time of the confirmation video subsequent to the confirmation video selected as having an error is displayed in search date and time designation portion 41, and the video at the time is displayed in the video display portion. The end time of the previous confirmation image of the selected confirmation image may be displayed. When it is desired to change the search time, another time may be input in search date and time designation portion 41 and search button 45 may be operated.

Although search camera designation portion 42 is similar to the person search screen (see FIGS. 6 and 7), in the initial state of the additional person search screen, the video from camera 1 which images the selected confirmation video is displayed. In a case where a person set as a tracking target cannot be found from the video from the same camera 1, another camera 1 may be selected in search camera designation portion 42.

Playback operation portion 44 is the same as the person search screen (see FIGS. 6 and 7). The movement range (the display time adjustment range) of slider 53 is a period before the start time of the subsequent confirmation video. That is, the playback time can be adjusted by operating slider 53, during the period (1 hour or 6 hours) designated by adjustment range designation button 55, with the start time of the subsequent confirmation video as the end point (right end) of bar 54.

Here, in a case where a video showing the person set as the tracking target is found and the person frame is displayed on the person, on the additional person search screen, that is, the tracking of the person set as the tracking target is successful during a period corresponding to a confirmation video having an error, the designation of the search person is completed by selecting the person frame. Then, tracking information corrector 34 of inter-camera tracking processor 22 corrects the tracking information such that the person selected on the additional person search screen is associated with the person who is first designated as the tracking target. Then, the timeline screen (see FIG. 10) in a confirmation video display state is displayed on monitor 7 in a state where the result of correcting the tracking information is reflected.

The result of correcting the tracking information is reflected on the timeline screen in the confirmation video display state, that is, the confirmation video selected as having an error on the timeline screen in the confirmation video display state is replaced with the video of the person selected on the additional person search screen and displayed. As the confirmation video having an error is replaced with the video of another person, the preceding and subsequent confirmation videos of the replaced confirmation video may be changed. This is the same as the case where a candidate video is selected on the timeline screen (see FIG. 13) in the candidate video display state.

On the other hand, in a case where a video showing the person set as the tracking target is found but the person frame is not displayed on the person, on the additional person search screen, that is, the tracking of the person set as the tracking target is failed during the period corresponding to the confirmation video having an error, the monitoring person can designate a period during which the person set as the tracking target is shown as a video display period, instead of selecting the person.

As shown in FIGS. 14 and 15, video display period designation portion 81 is provided on the additional person search screen. The monitoring person designates a period during which the person set as the tracking target is shown as a video display period, in video display period designation portion 81. The video display period is defined by the start time and the end time, and video display period designation portion 81 includes start time input portion 83, end time input portion 84, start time decision button 85, and end time decision button 86. If the start time is input in start time input portion 83 and start time decision button 85 is operated, the start time is decided. If the end time is input in end time input portion 84 and end time decision button 86 is operated, the end time can be decided. Setting cancellation button 82 is an operation button for canceling the setting used for redoing the designation of the start time and the end time.

If the video display period is input in this way, the tracking information is corrected so as to add the video display period to the tracking information, the screen returns to the timeline screen (see FIG. 10) in the confirmation video display state, and the video during the video display period designated on the additional person search screen is displayed as the confirmation video, instead of the confirmation video having an error, on the timeline screen in the confirmation video display state. At this time, in an initial state, the video at the start time of the video display period is displayed as a still video.

Here, since the tracking information of the person set as the tracking target is interrupted by designating the video display period instead of the selection of the person, the next to the confirmation video replaced with the video during the designated video display period is blank, but if it is assumed that a person is present in the monitoring area, while switching camera 1 as necessary on the additional person search screen, a video showing a person set as the tracking target may be found, and the video display period may be designated one by one. If a video showing a person set as a tracking target is found on the additional person search screen and a person frame is displayed on the person set as the tracking target, it is possible to designate a person by selecting the person frame, and in this case, inter-camera tracking based on the link score is performed to generate tracking information. In the tracking information generated in this way, the missing portion of the tracking information generated by the inter-camera tracking is interpolated during the video display period designated on the additional person search screen. Thus, when continuous playback is performed on the timeline screen in a continuous playback state (see FIG. 11), the video of the person set as the tracking target can be played without interruption.

The start time and the end time may be input based on the imaging time displayed on video display portion 43, but the start time may be set by performing a start time setting operation in a state immediately after the person set as the tracking target appears in the video, for example, by operating start time decision button 85, and the end time may be set by performing an end time setting operation in a state immediately before the person set as the tracking target disappears from the video, for example, by operating end time decision button 86.

Instead of the operations of start time decision button 85 and end time decision button 86, the start time may be set by the first click operation and the end time may be by the second click operation on the video screen relating to video playback, and it is possible to accurately set a video display period during which the person set as the tracking target appears in the video, without the monitoring person changing the line of sight.

Figure 16:
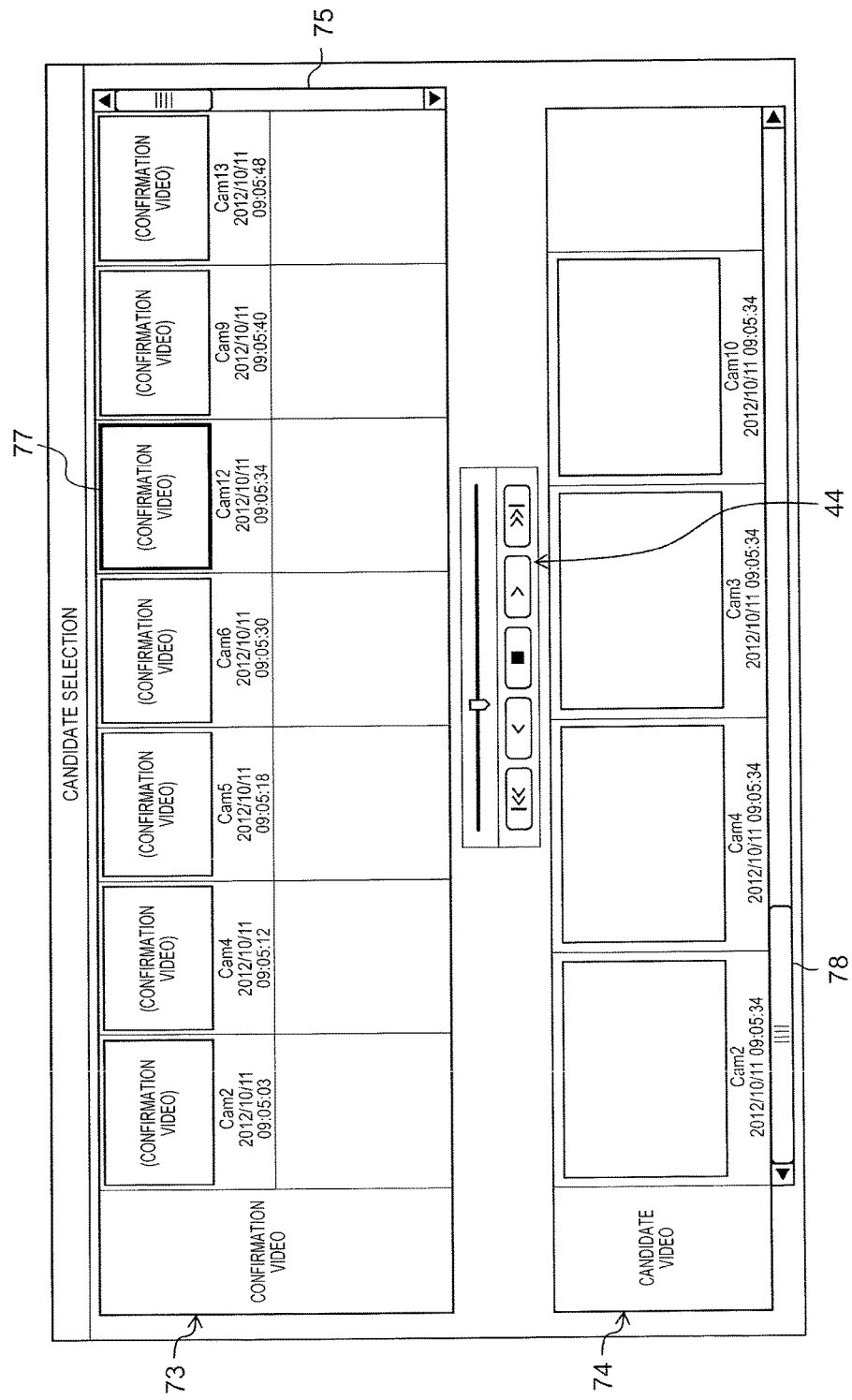
FIG. 16 is an explanatory diagram illustrating another example of the timeline screen displayed on monitor 7.

Next, another example of the timeline screen shown in FIG. 10 and the like will be described. FIG. 16 is an explanatory diagram illustrating another example of the timeline screen displayed on monitor 7.

In another example of the timeline screen, confirmation video viewer 73, candidate video viewer 74, and playback operation portion 44 are provided. Playback operation portion 44 is similar to the timeline screen shown in FIG. 10 and the like.

Confirmation videos are arranged and displayed in order of imaging time, in confirmation video viewer 73 in another example of the timeline screen, similar to the timeline screen shown in FIG. 10 and the like. Confirmation videos are arranged and displayed in a row in confirmation video viewer 73 on the timeline screen shown in FIG. 10 and the like, but confirmation videos are arranged and displayed in two rows. First scroll bar (scroll operation portion) 75 is provided in confirmation video viewer 73. First scroll bar 75 is used to slide and display the confirmation videos in a vertical direction, when all the confirmation videos do not fit in confirmation video viewer 73. If the confirmation video in confirmation video viewer 73 is selected, frame video 77 showing the selection state is displayed in the confirmation video.

Similar to the timeline screen shown in FIG. 10 and the like, a predetermined number of candidate videos having the highest link score are displayed in a descending order on candidate video viewer 74, but in this alternative example, candidate videos are arranged and displayed from the left in a descending order of the link score. Second scroll bar (scroll operation portion) 78 is provided in candidate video viewer 74. Second scroll bar 78 is used to slide and display the candidate videos in a horizontal direction, when all the candidate videos do not fit in candidate video viewer 74.

FIG. 16 shows the timeline screen in the candidate video display state, but only confirmation videos are displayed in confirmation video viewer 73 on the timeline screen in the confirmation video display state and on the timeline screen in the continuous playback state, similar to the examples shown in FIGS. 10 and 11, and if the confirmation video is selected, a candidate video is displayed in candidate video viewer 74.

As described above, in the present exemplary embodiment, tracking target setter 24 displays the videos accumulated in recorder 2 on monitor 7, and in response to a monitoring person's operation input of designating a person to be a tracking target on the videos, sets the designated person as the tracking target, confirmation video presenter 25 extracts for each of cameras 1, a video of a person having a highest possibility of being the person set as the tracking target, based on tracking information acquired in a tracking process on the videos accumulated in recorder 2, and displays a tracking target confirmation screen in which only the extracted videos are displayed as a confirmation video, on monitor 7, and candidate video presenter 26 extracts a predetermined number of videos of a person whose possibility of being the person set as the tracking target is the next highest of the person corresponding to the confirmation video having an error, in a descending order, based on the tracking information, in a case where there is an error in the confirmation video displayed on the tracking target confirmation screen, and displays on monitor 7, a candidate selection screen in which the extracted videos are displayed as candidate videos so as to cause the monitoring person to select the candidate video corresponding to the person designated as the tracking target.

According to this, since the video from camera 1 having the highest possibility of showing the person set as the tracking target is refined and displayed, it is possible to efficiently check the tracking result for a person. Then, in a case where there is an error in the confirmation video displayed on the tracking target confirmation screen, that is, there is an error in the tracking result for the person, a video whose possibility of showing the person set as the tracking target is the next highest of the confirmation video is displayed as a candidate video on the candidate selection screen, such that the tracking information is corrected only by the monitoring person selecting the candidate video, and thus tracking information can be corrected with a simple operation.

In the present exemplary embodiment, it is assumed that a plurality of confirmation videos are arranged and displayed in order of imaging time on the tracking target confirmation screen. According to this, confirmation videos are arranged and displayed in order of imaging time on the tracking target confirmation screen, so the monitoring person can check whether there is an error in the tracking result for the person set as the tracking target by only viewing the confirmation videos in order, and it is possible to more efficiently check the tracking result for a person.

In the present exemplary embodiment, it is assumed that tracking target setter 24 causes the monitoring person to select a plurality of cameras, arranges and displays videos from the selected plurality of cameras on a screen, and causes the monitoring person to designate a person to be a tracking target. According to this, since the videos from the plurality of camera assumed to image the person to be the tracking target are displayed on the same screen, the monitoring person can efficiently designate a person to be the tracking target.

In the present exemplary embodiment, first scroll bar (scroll operation portion) 75 that slides and displays the confirmation videos in the arrangement direction of the confirmation videos when a plurality of confirmation videos cannot fit in the display area of the confirmation videos on the tracking target confirmation screen is provided on the tracking target confirmation screen. According to this, it is possible to check all the confirmation videos within one screen, and the monitoring person can efficiently check whether or not there is an error in the tracking result for the person set as the tracking target.

In the present exemplary embodiment, it is assumed that second scroll bar (scroll operation portion) 78 that slides and displays the candidate videos in the arrangement direction of the candidate videos when a plurality of candidate videos cannot fit in the display area of the candidate videos on the candidate selection screen is provided on the candidate selection screen. According to this, it is possible to check all the candidate videos within one screen, and the monitoring person can efficiently select candidate videos.

Further, in the present exemplary embodiment, tracking target setter 24 displays on monitor 7, a tracking target search screen on which a video satisfying a search condition is displayed, in response to an operation input by a monitoring person of inputting the search condition about an imaging date and time and a camera, and causes the monitoring person to search for a video showing the person to be the tracking target on the tracking target search screen, and to designate the person to be the tracking target. According to this, since the videos displayed on the tracking target search screen are refined in accordance with the search condition related to the imaging date and time and the camera, the monitoring person can efficiently designate the person to be the tracking target.

In the present exemplary embodiment, the candidate selection screen is configured by adding candidate video viewer 74 for displaying a candidate video on the tracking target confirmation screen. According to this, since the candidate video is displayed on the same screen as the confirmation video, the monitoring person can select candidate videos while comparing the candidate video with the confirmation video, and the monitoring person can efficiently select the candidate video.

In the present exemplary embodiment, it is assumed that video player 29 displays on monitor 7, a continuous playback screen in which a person set as the tracking target, and a video from each camera 1 related to a person associated as the same as the person are arranged and displayed in order of imaging time, and performs continuous playback in which the video from each camera 1 is sequentially displayed as a moving image with the lapse of time, on the continuous playback screen. According to this, since the person set as the tracking target can be tracked continuously, the monitoring person can easily check what action the person set as the tracking target performs in the monitoring area.

In the present exemplary embodiment, it is assumed that screen generator 30 displays a camera position confirmation screen on which a position of camera 1 corresponding to a video being played on a map image indicating the state of a monitoring area, on monitor 7, in response to an operation of the monitoring person performed on the continuous playback screen. According to this, although it is difficult to know a position of camera 1 which captures the video being played back, only on the continuous playback screen, it is possible to simply check the position of camera 1 which captures a video being played back by viewing the camera position confirmation screen.

In the present exemplary embodiment, additional tracking target setter 27 displays on monitor 7, a video of a period corresponding to a confirmation video with an error, when there is no candidate video corresponding to the person designated as the tracking target among the candidate videos displayed on the candidate selection screen, and in response to an operation input by the monitoring person of designating a person to be the tracking target on the video, sets the designated person as an additional tracking target, and tracking information corrector 34 corrects tracking information such that the person who is set as the additional tracking target by additional tracking target setter 27 is associated with the person who is set as the tracking target by tracking target setter 24. According to this, even when there is no candidate video corresponding to the person designated as the tracking target among the candidate videos displayed on the candidate selection screen, the monitoring person designates the person who is the tracking target, and thus tracking information corresponding to a confirmation video with an error is corrected, so that it is possible to avoid the lack of tracking information.

In the present exemplary embodiment, video display period setter 28 sets the designated period as a video display period, in response to an operation input by the monitoring person of designating a period in which the person designated as the tracking target appears on a video, when there is no candidate video corresponding to the person designated as the tracking target among the candidate videos displayed on the candidate selection screen, and tracking information corrector 34 adds the video display period which is set by video display period setter 28 to the tracking information. According to this, even when there is no candidate video corresponding to the person designated as the tracking target among the candidate videos displayed on the candidate selection screen, the monitoring person designates the video display period, and thus tracking information corresponding to a confirmation video with an error is replaced with the video display period, so that it is possible to avoid the lack of tracking information. In particular, it is possible to prevent the video from being interrupted, when performing continuous playback in which the video from each camera is sequentially displayed as a moving image with the lapse of time.

Second Exemplary Embodiment

Figure 17:
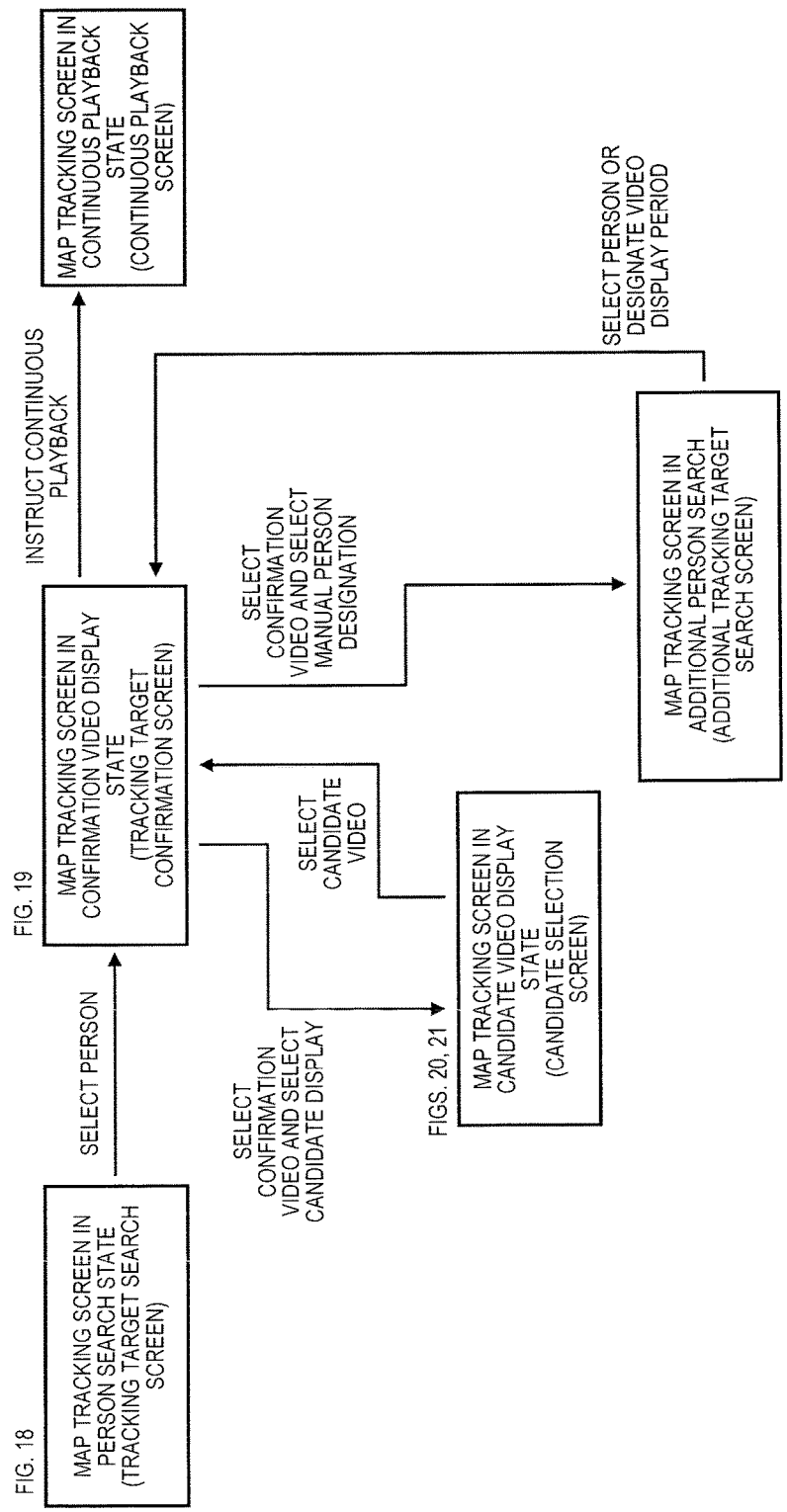
FIG. 17 is an explanatory diagram illustrating a transition status of a screen displayed on monitor 7 in a second exemplary embodiment.

Next, a second exemplary embodiment will be described. FIG. 17 is an explanatory diagram illustrating a transition status of a screen displayed on monitor 7 in the second exemplary embodiment. FIGS. 18, 19, 20 and 21 are explanatory diagrams illustrating map screens displayed on monitor 7. It is to be noted that those not specifically mentioned here are the same as in the above-described exemplary embodiment.

Figure 18:
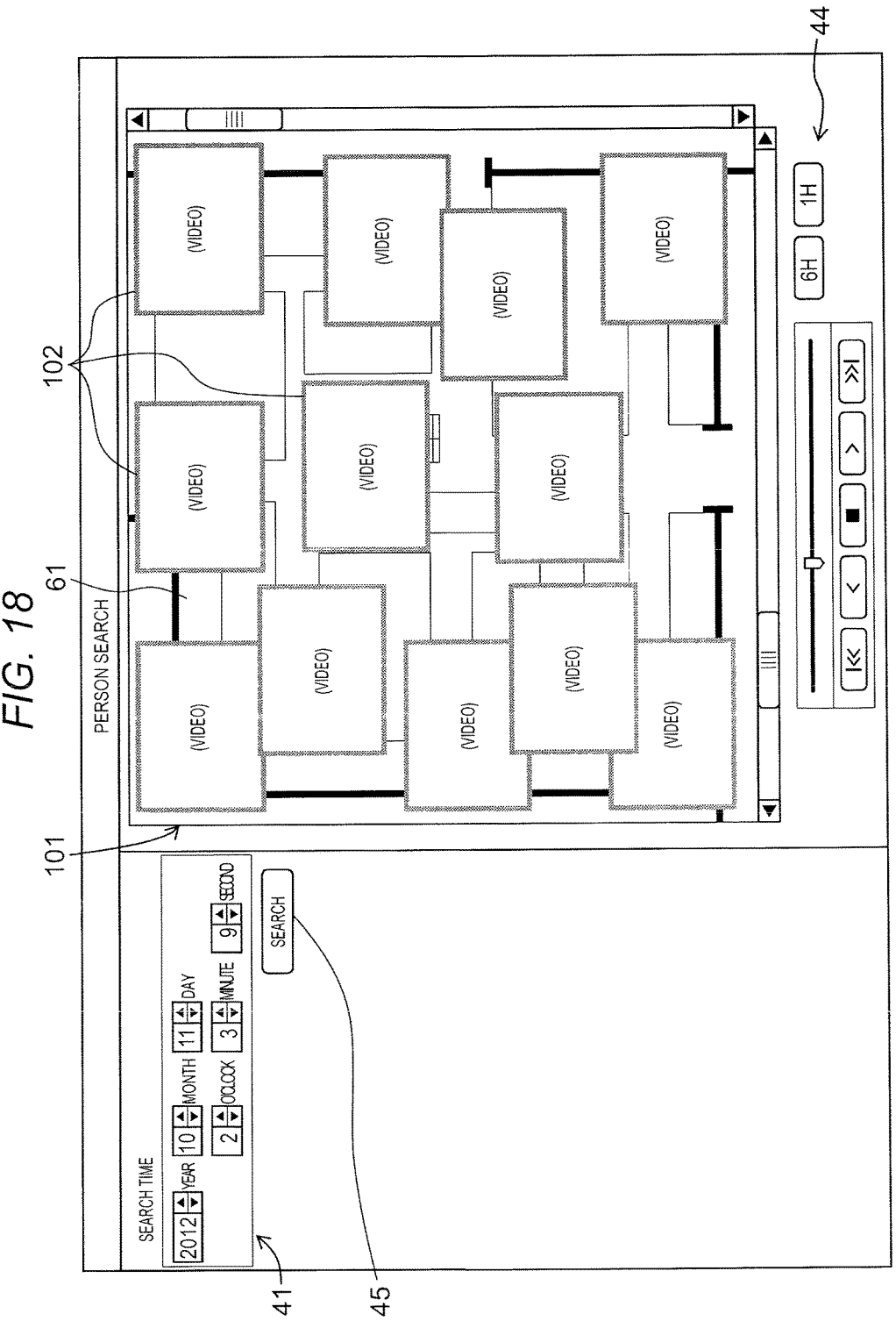
FIG. 18 is an explanatory diagram illustrating a map screen in a tracking target search state displayed on monitor 7.
Figure 19:
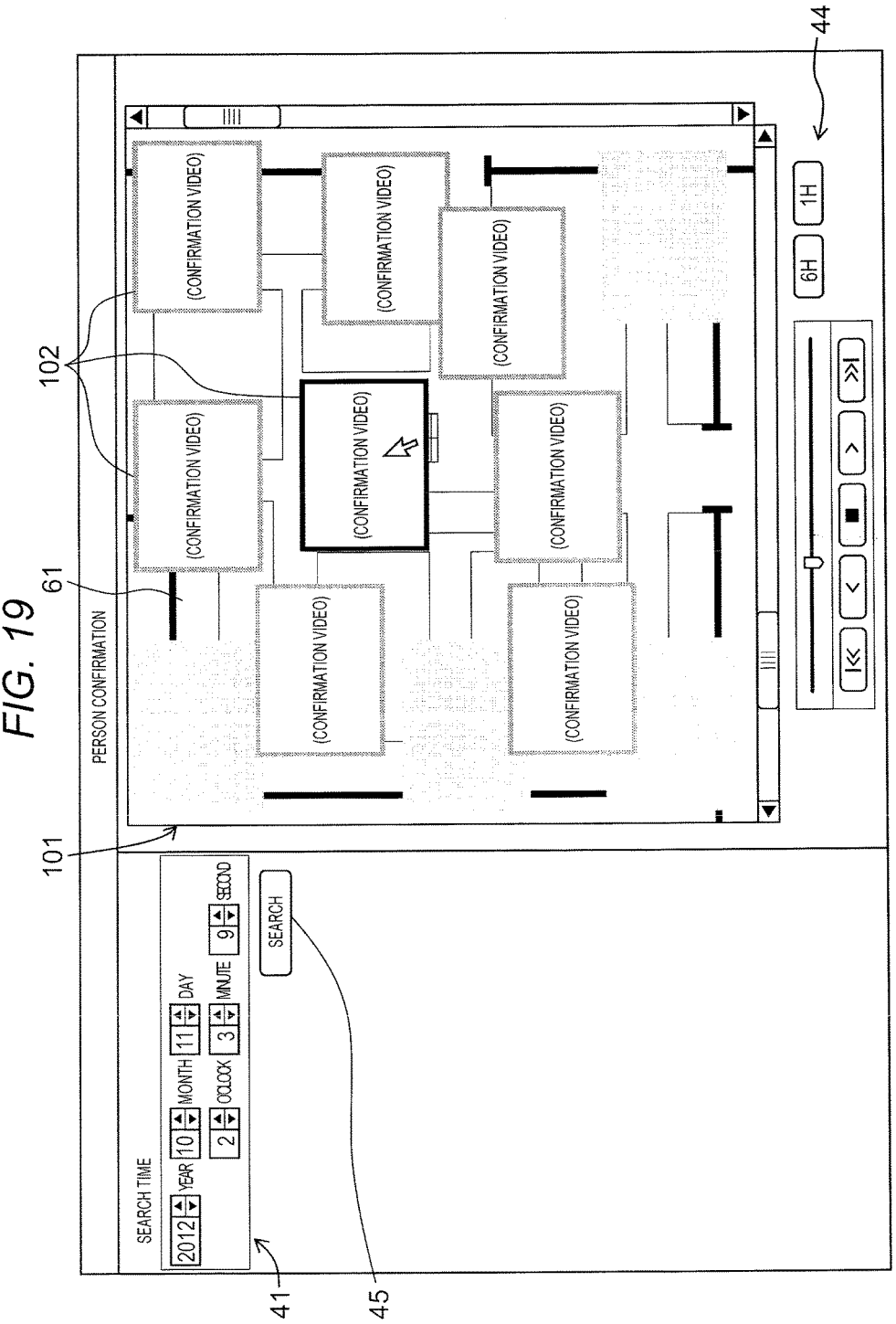
FIG. 19 is an explanatory diagram illustrating a map screen in a confirmation video display state displayed on monitor 7.
Figure 20:
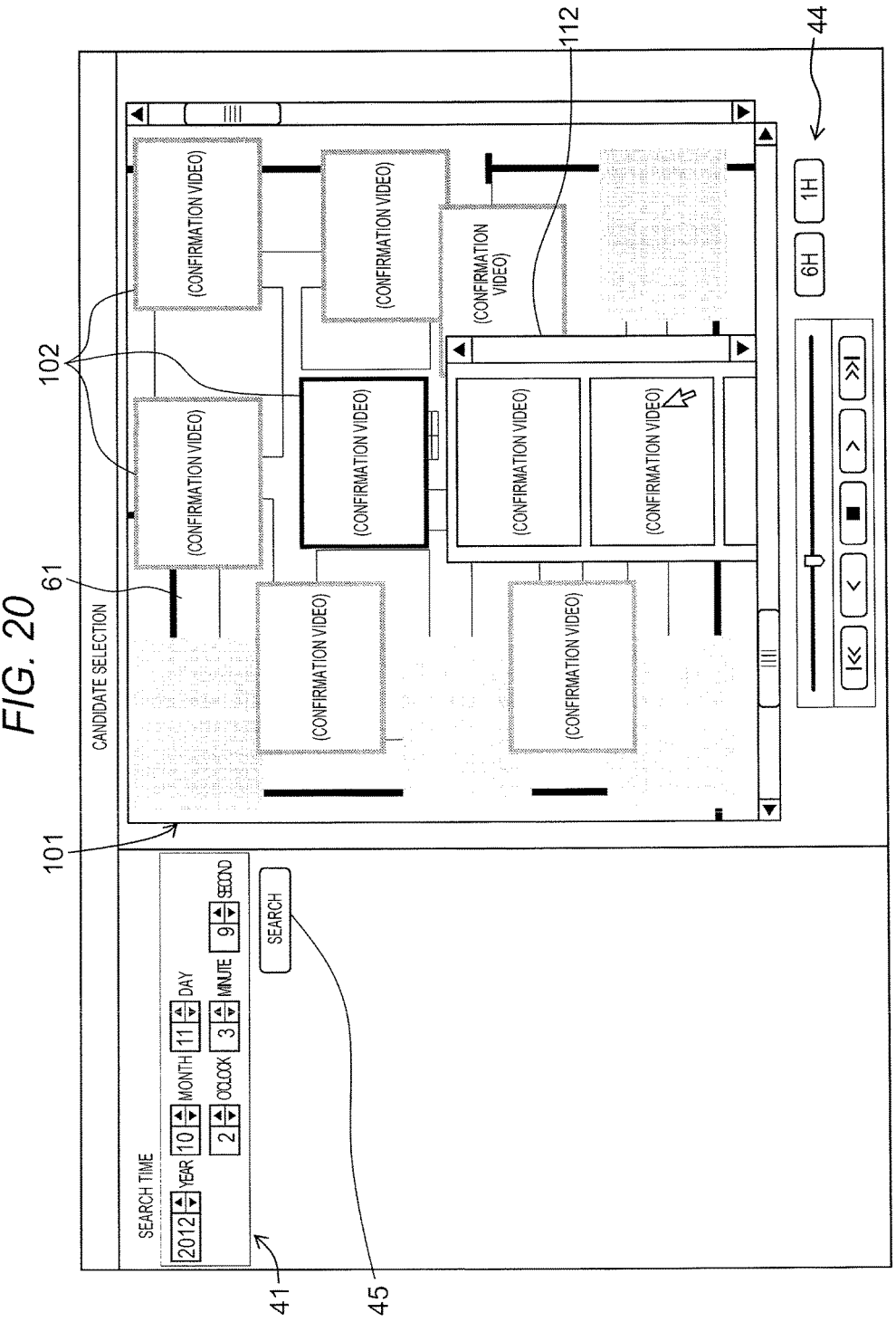
FIG. 20 is an explanatory diagram illustrating a map screen in a candidate video display state displayed on monitor 7.
Figure 21:
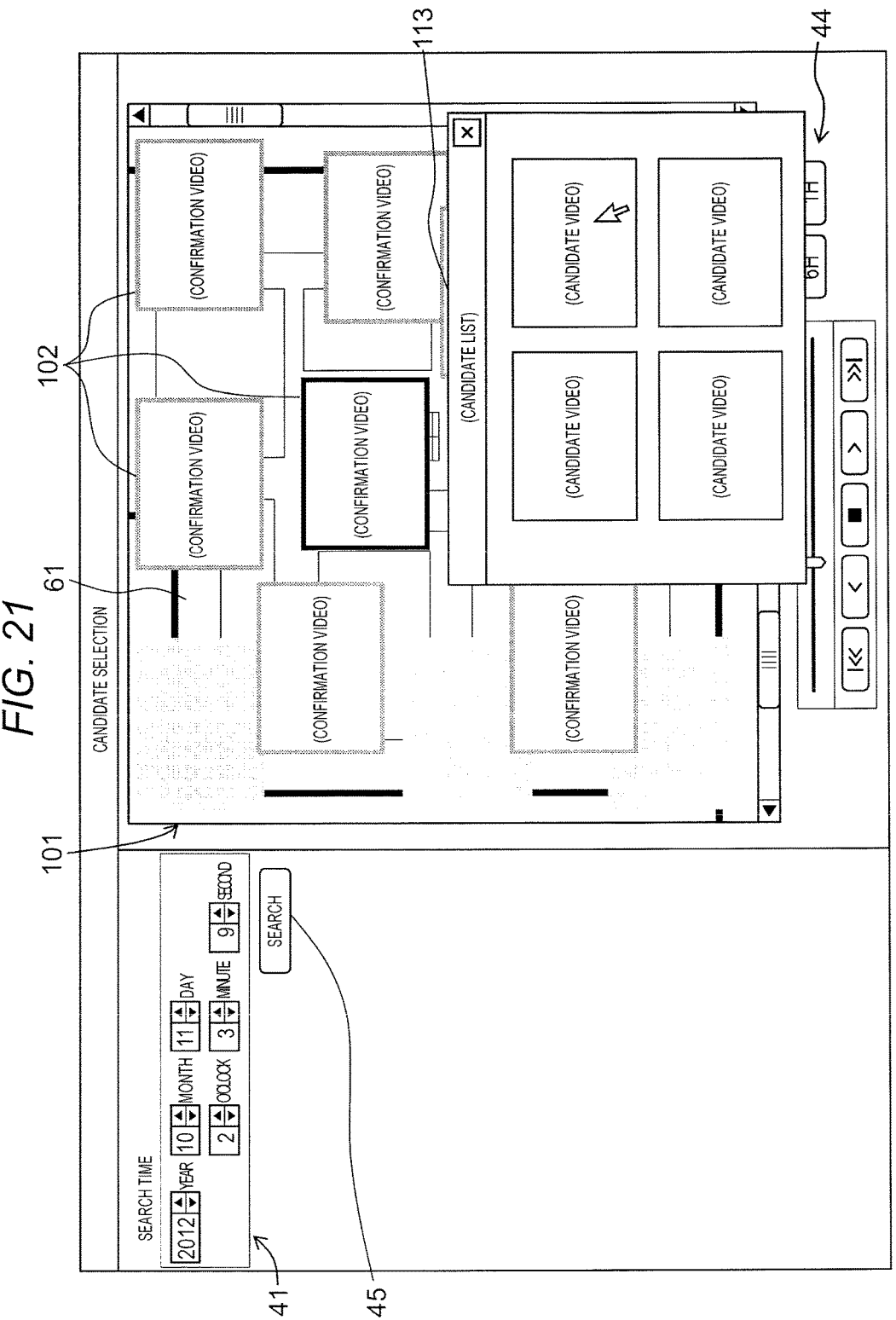
FIG. 21 is an explanatory diagram illustrating a map screen in a candidate video display state displayed on monitor 7.

Although the person search screens shown in FIGS. 6 and 7 are displayed as the tracking target search screen for designating a person which is a tracking target in the first exemplary embodiment, a map screen in the tracking target search state is displayed as the tracking target search screen, as shown in FIG. 18, in the second exemplary embodiment. Although the timeline screens shown in FIGS. 10 and 13 are displayed as the tracking target confirmation screen and the candidate selection screen in the first exemplary embodiment, map screens shown FIGS. 19 to 21 are displayed as the map screens in the second exemplary embodiment.

In the second exemplary embodiment, as shown in FIG. 17, if a person is selected on the map screen (tracking target search screen) in the person search state, a transition is made to the map screen (tracking target confirmation screen) in the confirmation video display state. If a candidate display is selected after a candidate video with an error is selected on the map screen in the candidate video display state, the screen transitions to the map screen (candidate selection screen) in the candidate video display state. If the candidate video is selected on the map screen in the candidate video display state, the screen returns to the map screen in the confirmation video display state, and the confirmation video reflecting the correction result of the tracking information is displayed. If the manual person designation is selected, a transition is made to a map screen (tracking target addition search screen) in the additional person search state. If a person is selected on the map screen in the additional person search state, the screen returns to the map screen in the confirmation video display state, and the confirmation video reflecting the correction result of the tracking information is displayed. If it is confirmed that there is no error in all the confirmation videos and an operation instructing the continuous playback is performed on the map screen in the confirmation video display state, a transition is made to the map screen (continuous playback screen) in the continuous playback state.

On the map screen, as will be described below, a video for each camera 1 is displayed on the map image showing the layout inside the store (state of the monitoring area), and the position of camera 1 can be checked on the map screen, such that the camera selection screen and the camera position confirmation screen are not needed as in the first exemplary embodiment.

On the map screens shown in FIG. 18 to FIG. 21, search date and time designation portion 41, video display unit 101, and playback operation portion 44 are provided. Search date and time designation portion 41 and playback operation portion 44 are the same as those in the first exemplary embodiment.

In video display unit 101, a plurality of video display windows (video display frames) 102 that each displays the video from each of cameras 1 are disposed on map image 61 showing the layout in the store (the state of the monitoring area). Each video display window 102 is disposed at the position approximately corresponding to the imaging region of camera 1 and the monitoring person can roughly recognize which position in the monitoring area represented as map image 61 is displayed in video display window 102.

FIG. 18 shows a map screen (tracking target search screen) in a tracking target search state. On the map screen in the tracking target search state, if the date and time is designated by search date and time specifying portion 41 and search button 45 is operated, the video from each camera 1 at the designated date and time is displayed in video display window 102 of video display unit 101. At this time, in video display portion 101, the videos from all cameras 1 are displayed in video display window 102, and the monitoring person views each video display window 102 to find a person to be a tracking target. If the corresponding person is found, the monitoring person performs an operation of selecting a person frame on the video in video display window 102 in which the person is shown.

FIG. 19 shows a map screen (tracking target confirmation screen) in a confirmation video display state. On the map screen in the confirmation video display state, only the video from camera 1 having the highest possibility of showing the person set as the tracking target is displayed as the confirmation video in video display window 102 in video display unit 101, and the other video display windows 102 are grayed out. In this manner, since the video from camera 1 having the highest possibility of showing the person set as the tracking target is refined and displayed on the map screen in the confirmation video display state, it is possible to efficiently check the tracking result for a person.

If there is no error in the confirmation video displayed in video display window 102 on the map screen in the confirmation video display state, the monitoring person can determine the confirmation video as having no error, in the menu displayed by selecting and right-clicking video display window 102. At this time, the display form of the frame image of video display window 102 changes from an unconfirmed state (for example, green) to a confirmed state (for example, changed). On the other hand, in a case where there is an error in the confirmation video displayed in video display window 102, when a candidate display is selected on the menu displayed by selecting and right-clicking video display window 102, a map screen in the candidate video display state shown in FIGS. 20 and 21 is displayed.

FIGS. 20 and 21 show map screens in a candidate video display state (candidate selection screen). In the example shown in FIG. 20, the candidate video is displayed on the same screen, candidate video viewer 112 is superimposed on the confirmation video selected as having an error, and a plurality of candidate videos are arranged and displayed in candidate video viewer 112. In the example shown in FIG. 21, the candidate video is displayed on a separate screen, and candidate display screen 113 is popped up on the map screen in the confirmation video display state.

When the candidate video displayed in candidate video viewer 112 shown in FIG. 20 or candidate display screen 113 shown in FIG. 21, the tracking information is corrected and the selected candidate video is displayed as the confirmation video in video display window 102. At this time, video display window 102 on which the video is displayed also changes depending on the correction of the tracking information.

The map screen (continuous playback screen) in the continuous playback state shown in FIG. 17 is substantially the same as the map screen in the confirmation video display state shown in FIG. 19, but videos showing the person who is the tracking target are sequentially played back in plural video display windows 102. The map screen in an additional tracking target search state shown in FIG. 17 is almost the same as the map screen in a tracking target search state shown in FIG. 18.

Third Exemplary Embodiment

Figure 22:
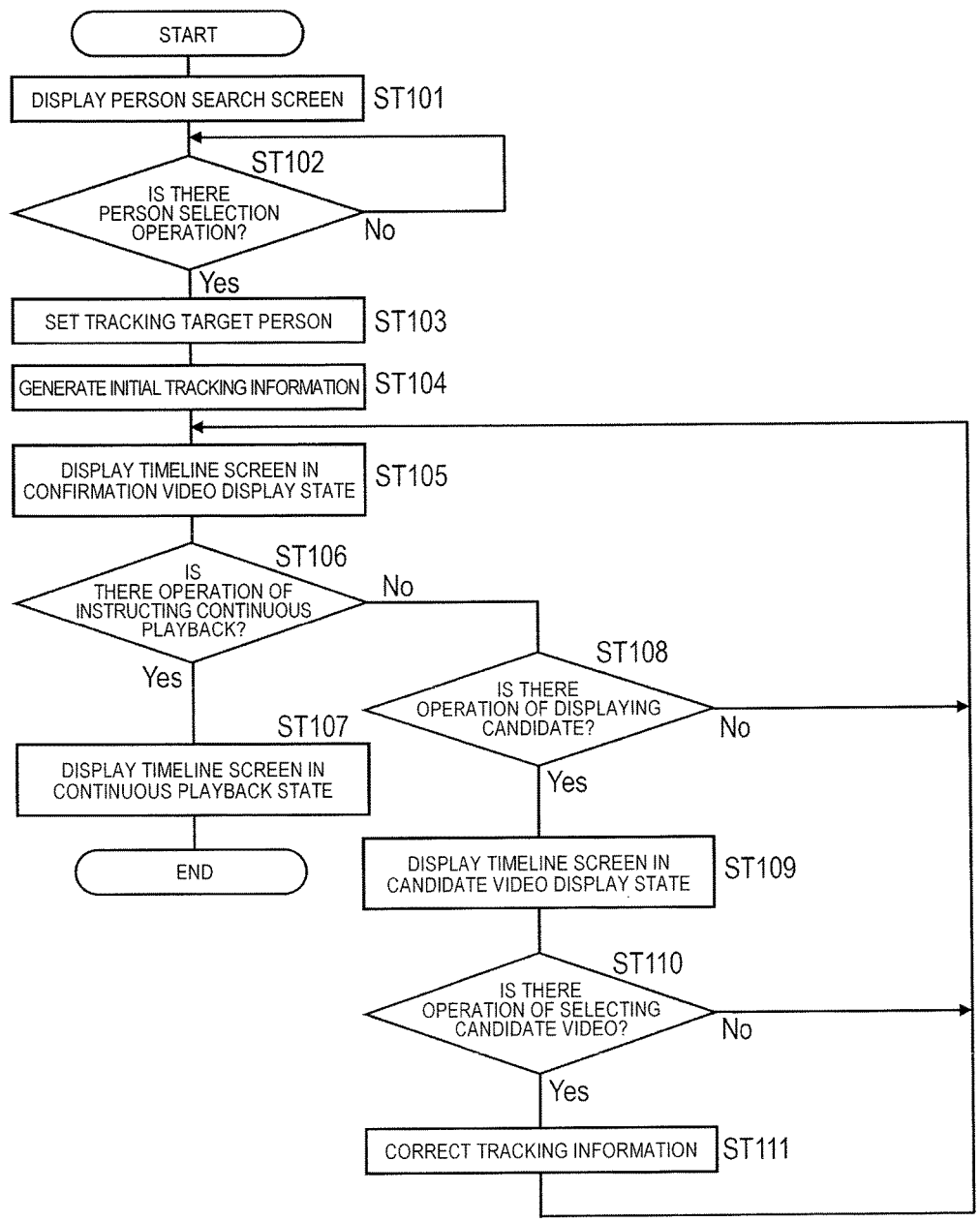
FIG. 22 is a flowchart illustrating a procedure of a process performed by each unit of PC 3 in a third exemplary embodiment.

FIG. 22 is a flowchart illustrating a procedure of a process performed by each unit of PC 3 in a third exemplary embodiment.

In the first exemplary embodiment shown in FIG. 5, when an appropriate candidate video is not found among the candidate videos displayed on the timeline screen in the candidate video display state (No in ST110), the monitoring person is made to search for the video showing the person set as the tracking target and to designate the person on the additional person search screen, and the period during which the person set as the tracking target is shown in the video is designated as a video display period, but these processes (ST112 to ST116) are omitted in the third exemplary embodiment.

Fourth Exemplary Embodiment

Figure 23:
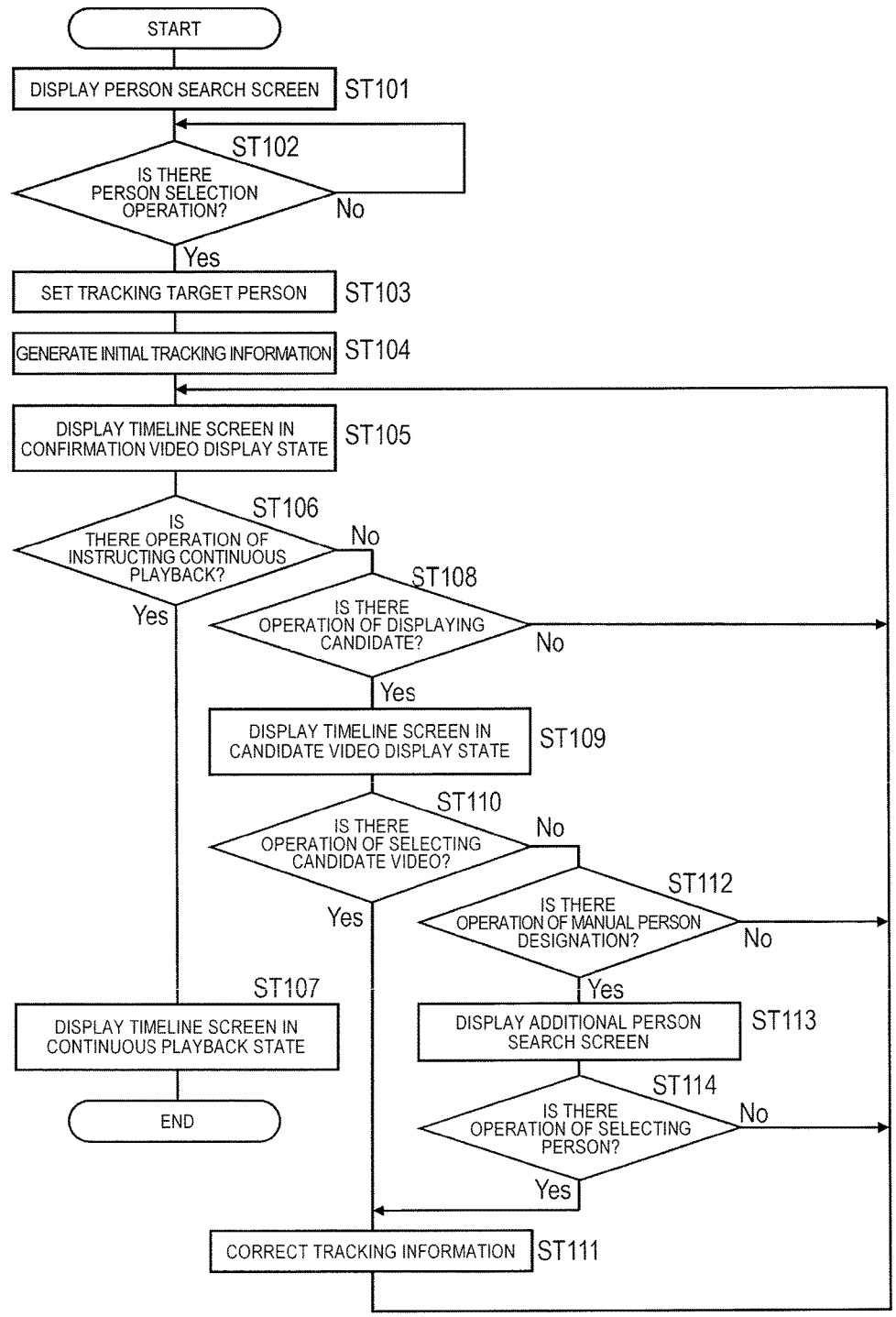
FIG. 23 is a flowchart showing a procedure of a process performed in each unit of PC 3 in a fourth exemplary embodiment.

FIG. 23 is a flowchart illustrating a procedure of a process performed by each unit of PC 3 in a fourth exemplary embodiment.

In the first exemplary embodiment shown in FIG. 5, in a case where the video of the person set as the tracking target is found on the additional person search screen, but the person cannot be designated because a person frame is not displayed on the person (No in ST114), the period during which the person set as the tracking target is shown in the video is designated as the video display period, but these processes (ST115 and ST116) are omitted in the fourth exemplary embodiment. Compared with the third exemplary embodiment, processes (ST112 to ST114) in which the monitoring person is made to search for the video showing the person set as the tracking target and to designate the person on the additional person search screen are added.

Although the present disclosure has been described based on specific exemplary embodiments, these exemplary embodiments are merely examples, and the present disclosure is not limited by these exemplary embodiments. In addition, all the constituent elements of the tracking assistance device, the tracking assistance system, and the tracking assistance method according to the present disclosure described in the exemplary embodiments are not necessarily indispensable, and can be selected as appropriate at least without departing from the scope of the present disclosure.

For example, in the above exemplary embodiment, an example of a retail store such as a supermarket has been described. However, the present disclosure can be applied to stores of a business type other than the retail store, such as a restaurant such as a family restaurant, and can also be applied to facilities such as business places other than stores.

In the above exemplary embodiment, an example in which a person is tracked as a moving object has been described, but it is also possible to trace a moving object other than a person, for example, a vehicle such as an automobile or a bicycle.

In the above exemplary embodiment, tracking information corrector 34 corrects the tracking information such that the person corresponding to the confirmation video presented by confirmation video presenter 25 based on the tracking information on the person set as the tracking target is replaced with the person corresponding to the candidate video presented by candidate video presenter 26 or the person who is designated by the monitoring person on the video, but the correction of the tracking information performed by tracking information corrector 34 also includes simply deleting erroneous tracking information. In other words, in a case where there is an error in the confirmation video but an appropriate video cannot be found in place of the confirmation video, a person corresponding to the confirmation video with an error is deleted from the tracking information.

In the above exemplary embodiment, as shown in FIGS. 1 and 3, an example has been described in which in-camera tracking processing device 4 performs the in-camera tracking process, and PC 3 performs the inter-camera tracking process and a tracking assistance process, but it is also possible to make PC 3 perform the in-camera tracking process. An in-camera tracking processor can be provided in camera 1. All or part of inter-camera tracking processor 22 can be configured with a tracking processing device different from PC 3.

In the above exemplary embodiment, as shown in FIG. 2, cameras 1 are box-type cameras whose viewing angle is limited. However, the present disclosure is not limited to this, but an omnidirectional camera capable of imaging a wide range can also be used.

In the present exemplary embodiment, the in-camera tracking process and the tracking assistance process are performed by the device installed in the store, but as shown in FIG. 1, these necessary processes may be performed by PC 11 provided in the head office, or cloud computer 12 constituting the cloud computing system. The necessary processes may be shared by a plurality of information processing devices, and information may be transferred between the plurality of information processing devices through a communication medium such as an IP network or a LAN, or a storage medium such as a hard disk or a memory card. In this case, the tracking assistance system is configured with the plurality of information processing devices that share necessary processes.

Particularly, in the system configuration including cloud computer 12, in addition to PCs 3 and 11 provided at the stores and head offices, necessary information may be displayed in a portable terminal such as smartphone 13 or the tablet terminal which is network-connected to cloud computer 12, such that necessary information can be confirmed at any place such as a place to go outside in addition to store and head offices.

In the above exemplary embodiment, recorder 2 that accumulates the videos from camera 1 is installed in the store, but when the processes necessary for the moving object tracking assistance are performed by PC 11 or cloud computer 12 installed in head office, the videos from camera 1 may be transmitted to the head office or the management facility of the cloud computing system, and the videos from camera 1 may be accumulated in the device installed therein.

INDUSTRIAL APPLICABILITY

The tracking assistance device, the tracking assistance system, and the tracking assistance method according to the present disclosure have an effect capable of efficiently checking whether there is an error in a tracking result for a moving object set as a tracking target, and correcting tracking information with a simple operation, in a case where there is an error in the tracking result for the moving object, and are useful as a tracking assistance device, a tracking assistance system, and a tracking assistance method which assist a monitoring person's work of tracking the moving object which is a tracking target, by displaying a captured image for each of a plurality of cameras, which is accumulated in image accumulation means, on a display device.

REFERENCE MARKS IN THE DRAWINGS

1 CAMERA
2 RECORDER (VIDEO ACCUMULATION MEANS)
3 PC (TRACKING ASSISTANCE DEVICE)
4 IN-CAMERA TRACKING PROCESSING DEVICE
6 INPUT DEVICE
7 MONITOR
11 PC
12 CLOUD COMPUTER
13 SMARTPHONE
21 TRACKING INFORMATION STORAGE
22 INTER-CAMERA TRACKING PROCESSOR
23 INPUT INFORMATION ACQUIRER
24 TRACKING TARGET SETTER
25 CONFIRMATION VIDEO PRESENTER
26 CANDIDATE VIDEO PRESENTER
27 ADDITIONAL TRACKING TARGET SETTER
28 VIDEO DISPLAY PERIOD SETTER
29 VIDEO PLAYER
30 SCREEN GENERATOR
31 LINK SCORE CALCULATOR
32 INITIAL TRACKING INFORMATION GENERATOR
33 CANDIDATE SELECTOR
34 TRACKING INFORMATION CORRECTOR
73 CONFIRMATION VIDEO VIEWER
74 CANDIDATE VIDEO VIEWER
75 FIRST SCROLL BAR (SCROLL OPERATION PORTION)
78 SECOND SCROLL BAR (SCROLL OPERATION PORTION)

The invention claimed is:

1. A tracking assistance device that displays on a display device, videos which are respectively captured by a plurality of cameras and are accumulated in video accumulation means, and assists a work by a monitoring person of tracking a moving object which is a tracking target, comprising:
  a tracking target setter that displays the videos accumulated in the video accumulation means on the display device, and in response to an operation input by a monitoring person of designating a moving object to be a tracking target on the videos, sets the designated moving object as the tracking target;
  a confirmation video presenter that extracts for each of the cameras, a video of a moving object having a highest possibility of being the moving object set as the tracking target, based on tracking information acquired in a tracking process executed on the videos accumulated in the video accumulation means, and displays a tracking target confirmation screen in which only the extracted videos are displayed as confirmation videos, on the display device;
  a candidate video presenter that extracts a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displays on the display device, a candidate selection screen in which the extracted videos are displayed as candidate videos so as to cause the candidate video corresponding to the moving object designated as the tracking target to be selected by the monitoring person; and
  a tracking information corrector that corrects the tracking information so as to associate the moving object corresponding to the candidate video selected on the candidate selection screen with the moving object set as the tracking target.

2. The tracking assistance device of claim 1, wherein a plurality of the confirmation videos are arranged and displayed in order of imaging time on the tracking target confirmation screen.

3. The tracking assistance device of claim 1, wherein the tracking target setter causes the monitoring person to select a plurality of cameras, arranges and displays videos from each of the selected plurality of cameras on a screen, and causes the monitoring person to designate a moving object to be a tracking target.

4. The tracking assistance device of claim 1, wherein a scroll operation portion for sliding and displaying the confirmation videos in an arrangement direction of the confirmation videos in a case where a plurality of the confirmation videos cannot fit in the display area of the confirmation videos on the tracking target confirmation screen is provided on the tracking target confirmation screen.

5. The tracking assistance device of claim 1, wherein a scroll operation portion for sliding and displaying the candidate videos in an arrangement direction of the candidate videos in a case where a plurality of the candidate videos cannot fit in the display area of the candidate videos on the candidate selection screen is provided on the candidate selection screen.

6. The tracking assistance device of claim 1, wherein the tracking target setter displays on the display device, a tracking target search screen on which a video satisfying a search condition is displayed, in response to an operation input by a monitoring person of inputting the search condition about a imaging date and time and the camera, and causes the monitoring person to search for a video showing the moving object to be the tracking target on the tracking target search screen, and to designate the moving object to be the tracking target.

7. The tracking assistance device according to claim 1, wherein the candidate selection screen is obtained by adding a candidate video viewer for displaying the candidate video to the tracking target confirmation screen.

8. The tracking assistance device of claim 1, further comprising:
  a video player that displays on the display device, a continuous playback screen in which a moving object set as the tracking target and a video from each of the cameras related to a moving object associated as the same as the moving object are arranged and displayed in order of imaging time, and performs continuous playback in which the video from each camera is sequentially displayed as a moving image with the lapse of time, on the continuous playback screen.

9. The tracking assistance device of claim 8, further comprising:
  a screen generator that displays on the display device, a camera position confirmation screen on which a position of the camera corresponding to a video being played on a map image indicating the state of a monitoring area, in response to an operation of the monitoring person performed on the continuous playback screen.

10. The tracking assistance device of claim 1, further comprising:
an additional tracking target setter that in a case where there is no candidate video corresponding to the moving object designated as the tracking target, among the candidate videos displayed on the candidate selection screen, displays a video of a period corresponding to the confirmation video with an error on the display device, and in response to an operation input by the monitoring person of designating the moving object to be the tracking target on the video, sets the designated moving object as an additional tracking target,
wherein the tracking information corrector corrects the tracking information such that the moving object which is set as the additional tracking target by the additional tracking target setter is associated with the moving object which is set as the tracking target by the tracking target setter.

11. The tracking assistance device of claim 1, further comprising:
a video display period setter that in a case where there is no candidate video corresponding to the moving object designated as the tracking target, among the candidate videos displayed on the candidate selection screen, in response to an operation input by the monitoring person of designating a period during which the moving object designated as the tracking target appears on a video, sets the designated period as a video display period,
wherein the tracking information corrector adds the video display period set by the video display period setter to the tracking information.

12. A tracking assistance system that displays on a display device, videos which are respectively captured by a plurality of cameras and are accumulated in a video accumulation means and assists a work by a monitoring person of tracking a moving object which is a tracking target, comprising:
the camera that captures an image of a monitoring area;
the display device that displays a video from each of the cameras; and
a plurality of information processing devices,
wherein any one of the plurality of information processing devices includes
tracking target setting means for displaying the videos accumulated in the video accumulation means on the display device, and in response to an operation input by a monitoring person of designating a moving object to be a tracking target on the videos, setting the designated moving object as the tracking target;
a confirmation video presenter that extracts for each of the cameras, a video of a moving object having a highest possibility of being the moving object set as the tracking target, based on tracking information acquired in a tracking process executed on the videos accumulated in the video accumulation means, and displays a tracking target confirmation screen in which only the extracted videos are displayed as confirmation videos, on the display device;
a candidate video presenter that extracts a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displays on the display device, a candidate selection screen in which the extracted videos are displayed as candidate videos so as to cause the candidate video corresponding to the moving object designated as the tracking target to be selected by the monitoring person; and
a tracking information corrector that corrects the tracking information so as to associate the moving object corresponding to the candidate video selected on the candidate selection screen with the moving object set as the tracking target.

13. A tracking assistance method causing an information processing device to perform a process of displaying on a display device, videos which are respectively captured by a plurality of cameras and are accumulated in video accumulation means and assisting a work by a monitoring person of tracking a moving object which is a tracking target, comprising:
a step of displaying the videos accumulated in the video accumulation means on the display device, and in response to an operation input by a monitoring person of designating a moving object to be a tracking target on the videos, setting the designated moving object as the tracking target;
a step of extracting for each of the cameras, a video of a moving object having a highest possibility of being the moving object set as the tracking target, based on tracking information acquired in a tracking process executed on the videos accumulated in the video accumulation means, and displaying a tracking target confirmation screen in which only the extracted videos are displayed as confirmation videos, on the display device; and
a step of extracting a predetermined number of videos of moving objects whose possibility of being the moving object set as the tracking target is the next highest of the moving object corresponding to the confirmation video having an error, in a descending order, based on the tracking information, in a case where there is an error in the confirmation video displayed on the tracking target confirmation screen, and displaying on the display device, a candidate selection screen in which the extracted videos are displayed as candidate videos so as to cause the candidate video corresponding to the moving object designated as the tracking target to be selected by the monitoring person.

* * * * *